US006953769B2

United States Patent
Yamada et al.

(10) Patent No.: US 6,953,769 B2
(45) Date of Patent: Oct. 11, 2005

(54) EXHAUST GAS PURIFYING CATALYST

(75) Inventors: Hiroshi Yamada, Hiroshima (JP); Seiji Miyoshi, Hiroshima (JP); Akihide Takami, Hiroshima (JP); Kenji Okamoto, Hiroshima (JP); Masahiko Shigetsu, Hirohsima (JP); Hisaya Kawabata, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 483 days.

(21) Appl. No.: 10/105,592

(22) Filed: Mar. 25, 2002

(65) Prior Publication Data

US 2002/0187893 A1 Dec. 12, 2002

(30) Foreign Application Priority Data

Mar. 26, 2001 (JP) ........................................ 2001-088281
Nov. 30, 2001 (JP) ........................................ 2001-367227

(51) Int. Cl.[7] ........................... B01J 23/00; B01J 29/06; B01J 21/00; B01J 20/00
(52) U.S. Cl. ...................... 502/302; 502/303; 502/304; 502/325; 502/326; 502/327; 502/328; 502/330; 502/332; 502/333; 502/334; 502/339; 502/415; 502/439; 502/527.12; 502/65; 502/66; 502/73; 502/74
(58) Field of Search ................................ 502/302–304, 502/325–328, 330, 332–334, 339, 415, 439, 527.12, 65, 66, 73, 74

(56) References Cited

U.S. PATENT DOCUMENTS

| | | | | |
|---|---|---|---|---|
| 5,393,718 A | * | 2/1995 | Skeels et al. ................. 502/66 |
| 5,849,661 A | * | 12/1998 | Yamashita et al. .......... 502/328 |
| 5,948,376 A | * | 9/1999 | Miyoshi et al. .......... 423/213.5 |
| 6,090,744 A | * | 7/2000 | Koda et al. .................. 502/304 |
| 6,093,378 A | * | 7/2000 | Deeba et al. ............. 423/213.5 |
| 6,149,877 A | * | 11/2000 | Ogai .......................... 422/180 |
| 6,159,897 A | * | 12/2000 | Suzuki et al. ............... 502/351 |
| 6,461,579 B1 | * | 10/2002 | Hachisuka et al. ....... 423/213.5 |
| 6,497,848 B1 | * | 12/2002 | Deeba et al. ............... 422/180 |
| 6,518,213 B1 | * | 2/2003 | Yamamoto et al. ........... 502/65 |
| 6,557,342 B2 | * | 5/2003 | Suga et al. ................... 60/301 |
| 6,634,168 B1 | * | 10/2003 | Yamamoto ................... 60/285 |
| 6,727,202 B2 | * | 4/2004 | Deeba et al. ............. 423/239.1 |

FOREIGN PATENT DOCUMENTS

JP            9-872         6/1995

* cited by examiner

Primary Examiner—Cam N. Nguyen
(74) Attorney, Agent, or Firm—Brooks Kushman P.C.

(57) ABSTRACT

A catalyst comprises an HC trapping material that is capable of trapping HC in an exhaust gas under low temperatures and releasing HC with a raise in temperature and catalytic material containing a Ce—Pr double oxide capable of oxidizing and purifying HC from the HC trapping material with a high efficiency.

24 Claims, 14 Drawing Sheets

ALUMINA CONTENT
$[Al_2O_3/\{Al_2O_3 + (Ce-Pr)O_2\} \times 100\%]$

EXHAUST GAS PURIFYING CATALYST

BACKGROUND OF THE INVENTION

1. Field of the Invention

The present invention relates to a method of purifying exhaust gases and a catalyst for use in the exhaust gas purifying method.

2. Background Art

Typically, there have been known HC trapping type catalysts for purifying exhaust gases from a combustion apparatus for automobile engines. Such an HC trapping type catalyst comprises a trapping material that traps hydrocarbons (HC) in an exhaust gas at a lower temperature and releases HC trapped therein and a catalytic material that purifies HC released from the trapping material.

One of the HC trapping type catalysts, that is disclosed in, for example, Japanese Unexamined Patent Publication No. 9-872, comprises an HC trapping layer of β-type zeolite that is coated on a wall of a pour of a cordierite honeycomb substrate and a catalyst layer of a composite oxide of alumina and barium oxide with palladium carried on the composite oxide that is coated over the HC trapping layer. It is also disclosed in the publication mentioned above that an oxide containing Pr ions can be utilized as a NOx trapping material and an oxide containing cerium ions can be utilized as an oxygen absorption material.

SUMMARY OF THE INVENTION

It is an object of the present invention to provide an HC trapping catalyst for purifying exhaust gases that is improved in HC trapping efficiency by using a double oxide containing Ce and Pr ions.

It is another object of the present invention to provide an HC trapping catalyst for purifying exhaust gases that is improved in NOx purification efficiency by using a double oxide containing Ce and Pr ions.

It is still another object of the present invention to provide a method of purifying exhaust gases with a high HC purification efficiency.

The above objects of the present invention are achieved by an exhaust gas purifying catalyst comprising a trapping material that traps HC in an exhaust gas under a comparatively low exhaust gas temperature and releases said HC with a rise in exhaust gas temperature and a catalytic material that contains a Ce—Pr double oxide containing Ce and Pr ions and purifies said HC released from said trapping material.

According to the exhaust gas purifying catalyst, the Ce—Pr double oxide works as an oxygen absorption material that has outstanding oxygen releasing performance at comparatively low temperatures, so that, although the HC trapping material releases HC at a lower temperature, the exhaust gas purifying catalyst supplies oxygen having high reactivity from the CE—Pr double oxide. This is advantageous to oxidizing and purifying HC with the catalytic material.

These HC trapping material and catalytic material are preferably carried in the form of double layers, under and outer layers, on a substrate such that the HC trapping material is coated as an under layer and the catalytic material is coated as an outer layer on the under layer. The exhaust gas purifying catalyst thus structured prevents the HC trapping material from being directly exposed to a hot exhaust gas, so as thereby to be advantageous to improvement of durability.

The catalytic material may contain at least one novel metal selected from a group of Pt, Pd and Rh. These noble metals are apt to change into a metallic state resulting from that the Ce—Pr double oxide having high oxygen absorbing performance takes oxygen away from the noble metal and, accordingly, have high activity as catalysts. That is, these noble metals effectively act on HC as an oxidation catalyst. In the case where the catalytic material contain Pt and Rh, a reduction reaction is accelerated between NO and hydrogen and between NO and CO, so as to be advantageous to reduction and purification of Nox.

The catalytic material contains a NOx trapping material that traps NOx in an exhaust gas while the exhaust gas is under a comparatively high oxygen concentration and releases the NOx while the exhaust gas lowers its oxygen concentration. The exhaust gas purifying catalyst containing the NOx trapping material in the catalytic material prevents NOx from being discharged as being not reduced and purified while the exhaust gas is under a comparatively high oxygen concentration.

Conceivably, NOx trapped by the NOx trapping material in the catalytic material momentarily moves in the form of an anion to the catalytic metal traveling a surface of the Ce—Pr double oxide when it is released from the NOx trapping material. Since the movement of NOx is comparatively smooth, it is presumed that the use of the NOx trapping material is advantageous to NOx reduction. Specifically, the fact that the Ce—Pr double oxide has high oxygen absorbing performance as was previously mentioned indicates that the Ce—Pr double oxide is apt to change its oxidation number, in other words, that surface electric charges of the Ce—Pr double oxide is unstable. In order for NOx to move traveling the surface of the Ce—Pr double oxide from the NOx trapping material, it is necessary for the Ce—Pr double oxide to put equilibrium of the surface electric charges into disorder. That the surface electric charges are unstable indicates that the equilibrium of the surface electric charges tends to be put into disorder, i.e. that NOx is apt to move toward the catalytic metal. This results in the presumption that the use of the catalytic metal causes NOx to be easily reduced.

The NOx trapping material may be any one selected from a group of alkaline metals, alkaline earth metals and rare earth elements and is preferably one selected from a group of Ba, K, Sr and Mg. Further, the NOx trapping material may comprises two or more than two of these metals and elements.

The catalytic material may contain alumina. The weight of the alumina is preferably 60 to 90%, and more preferably 70% to 80%, of a total weight of the alumina and the Ce—Pr double oxide. In other words, most preferably, the Ce—Pr double oxide is lower in weight than the alumina. The exhaust gas purifying catalyst containing the alumina in the catalytic material is advantageous to reducing HC emission while the exhaust gas purifying catalyst is under comparatively lower temperatures.

Experiments on HC purification efficiency of the Ce—Pr double oxide that were conducted by the inventors of this instant led the conclusion that the exhaust gas purifying catalyst containing the Ce—Pr double oxide in the catalytic material smaller in weight than the alumina had higher HC purification efficiency than the exhaust gas purifying catalyst that containing the Ce—Pr double oxide in the catalytic material greater in weight than the alumina. It is conceivably deemed that a proper amount of Ce—Pr double oxide added as a support material to the exhaust gas purifying catalyst causes high dispersion of a catalytic metal on the support material in light of the fact that, while the alumina and the Ce—Pr double oxide work as support materials for the noble metal or noble metals, a catalyst exhibits poor light-off performance on HC purification when it contains the alumina alone as a support material in the catalytic material.

The Ce—Pr double oxide contains preferably 10% to 95% and more preferably 50% to 95% of Pr atoms in number against the total number of Ce and Pr atoms. This is because the exhaust gas purifying catalyst shows satisfactory light-off performance on HC, CO and NOx purification when it has a Ce—Pr double oxide containing 10% to 95% of Pr atoms and shows relatively high HC and CO purification efficiency when it has a Ce—Pr double oxide containing 50% to 95% of Pr atoms.

The above objects of the present invention are also achieved by a method of purifying exhaust gases using the catalyst that comprises a trapping material capable of trapping HC in an exhaust gas under a comparatively low exhaust gas temperature and releasing HC with a rise in exhaust gas temperature and a catalytic material containing a Ce—Pr double oxide containing Ce and Pr ions and being capable of purifying HC released from the trapping material. The method of purifying exhaust gases comprises the steps of detecting an oxygen concentration of exhaust gas contacting the catalyst and controlling the oxygen concentration of exhaust gas to become lower than a specified concentration when the HC trapping material is put under condition for releasing HC.

The HC trapping material is enabled to release HC when an exhaust gas is in a range of comparatively low temperatures between approximately 150° C. and approximately 200° C. In this temperature range, it is hard to utilize effectively oxygen supplied into the exhaust gas effectively for oxidization of HC released from the HC trapping material even though the oxygen concentration of the exhaust gas is raised since the catalytic material is still poor in activity. However, in the method of purifying exhaust gases of the invention, the Ce—Pr double oxide is promoted to release oxygen resulting from that the concentration of exhaust gas is lowered when the HC trapping material releases HC. The oxygen works effectively for oxidization of HC due to its high activity even though the catalytic material is low in activity.

In the method of purifying exhaust gases, an air-fuel ratio may be controlled to bring it toward a rich side from a stoichiometric air-fuel ratio, for example 14.0 to 14.6 and more preferably 14.0 to 14.5, when the HC trapping material is put under condition for releasing HC so as thereby to purify an exhaust gas.

According to the exhaust gas purifying catalyst of the present invention, the catalytic material contains Ce—Pr double oxide that is excellent in oxygen releasing performance in a comparatively low temperature range, the catalytic material promotes oxidization of HC even while the HC trapping material releases HC at a comparatively low temperature. This improves low temperature HC purification performance of the catalyst.

Furthermore, according to the method of purifying exhaust gases of the present invention, the oxygen concentration of exhaust gas is lowered below a specified oxygen concentration so as thereby to cause the catalytic material containing a Ce—Pr double oxide to oxidize and purify HC released from the HC trapping material when the HC trapping material is put under condition for releasing HC. Therefore, since the Ce—Pr double oxide releases high active oxygen resulting from a fall in oxygen concentration of an exhaust gas upon releasing HC, HC released from the HC trapping material is effectively oxidized utilizing the high active oxygen. This is advantageous to HC purification under low temperatures.

BRIEF DESCRIPTION OF THE DRAWINGS

The above and other objects and features of the present invention will be clearly understood from the following detailed description when read with reference to the accompanying drawings, wherein the same numeral numbers have been used to denote same or similar parts or mechanisms throughout the drawings and in which.

DETAILED DESCRIPTION OF THE PREFERRED EMBODIMENT(S)

Figure 1:
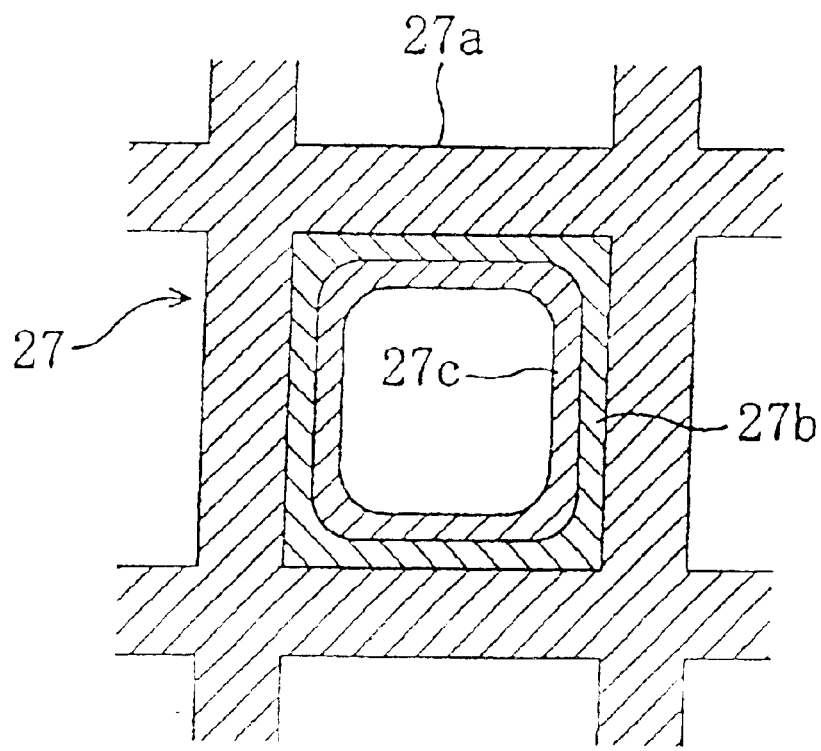
FIG. 1 is a cross sectional view of a part of a catalyst according to an embodiment of the present invention.

Referring to the drawings in detail and, in particular, to FIG. 1 showing an HC trapping type exhaust gas purifying catalyst 27 (which is hereafter referred to as an HC trapping catalyst for simplicity) according to the present invention formed on a cordierite honeycomb substrate 27a. The cordierite honeycomb substrate 27a has a number of cells (only one of which is depicted) with a catalyst layer 27b and a catalyst layer 27c coated as under and outer layers, respectively, in the cell. The outer catalyst layer 27c contains an HC trapping material operative to trap HC in an exhaust gas under comparatively lower temperatures and to release HC into the exhaust gas as the temperature raises. The under catalyst layer 27b contains a Ce—Pr double oxide as a catalytic material operative to purify HC released from the HC trapping material. Each of these under and outer catalyst layers 27b and 27c contains a NOx trapping material that traps NOx in an exhaust gas containing oxygen high in concentration and releases NOx into the exhaust gas when the exhaust gas lowers its oxygen concentration and a noble metal that oxidizes HC released from the HC trapping material and reduces NOx released from the NOx trapping material. The catalyst layers 27b and 27c may be coated as outer and under, respectively, in the cell 27a.

Figure 13:
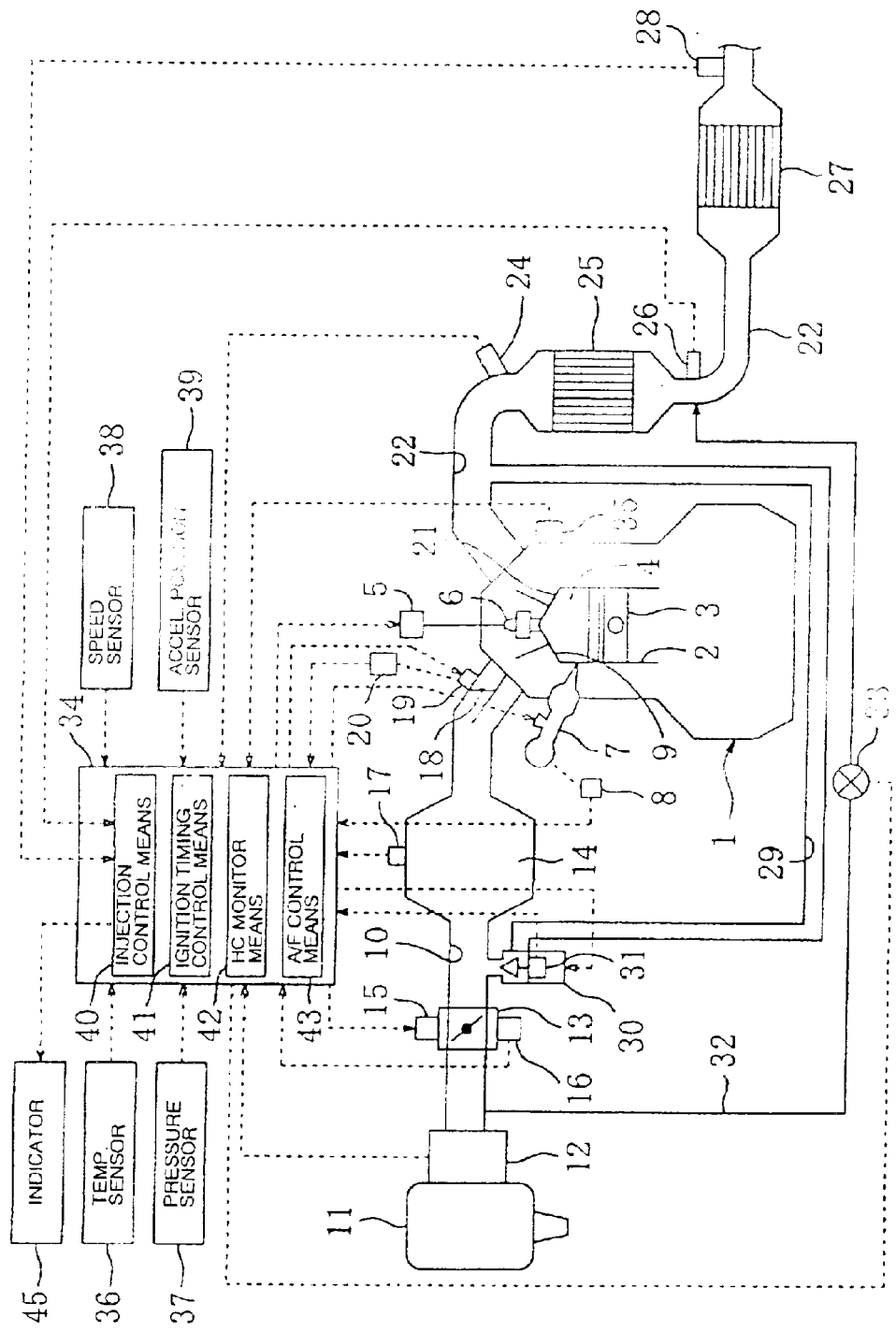
FIG. 13 is a schematic view of an exhaust purification system equipped an HC trapping catalyst of the present invention that is installed to a direct injection type gasoline engine.

The HC trapping catalyst 27 is disposed in an exhaust line 22 (which will be described later with reference to FIG. 13) and purifies HC, CO and NOx emissions in an exhaust gas from an engine 1 (see FIG. 13).

Various samples of the HC trapping catalyst were prepared and used for catalytic performance evaluations.

EXAMPLE I

A slurry for the under catalyst layer 27b was prepared by mixing a γ-alumina powder, a Ce—Pr double oxide powder containing CE and Pr ions as an oxygen absorption material, a hydrate alumina powder as a binder and water. The mixture slurry was coated as an under catalyst layer 27b on a cordierite honeycomb substrate 27a. The under catalyst layer 27b was dried at 150° C. for one hour and subsequently baked at 450° C. for two hours. The amounts of γ-alumina, Ce—Pr double oxide and hydrate alumina carried per one liter of cordierite honeycomb substrate 27a were 100 g/L, 100 g/L and substrate 20 g/L, respectively. The atom number ratio Ce:Pr (the ratio of the numbers of atoms Ce relative to the total number of Ce and Pr atoms) was 9:1, that is, the number of atoms of Pr was 10% of the total number of atoms of Ce and Pr.

A slurry for the outer catalyst layer 27c was prepared by mixing a β-type zeolite powder as a HC trapping material, a hydrate alumina powder as a binder and water. The mixture slurry was coated as an outer catalyst layer 27c over the under catalyst layer 27b. The outer catalyst layer 27c was dried at 150° C. for one hour and subsequently baked at 450° C. for two hours. The amounts of β-type zeolite and hydrate alumina carried per one liter of cordierite honeycomb substrate 27a were 100 g/L and 20 g/L, respectively. The β-type zeolite had pores having a mean pore diameter of approximately 0.72 nm.

The double catalyst layers formed on the cordierite honeycomb substrate 27a were impregnated with a homogeneous water solution of dinitrodiamin plutinum nitrate, rhodium nitrate, barium acetate, potassium acetate, magnesium acetate and strontium acetate. The double catalyst layers were subsequently dried at 150° C. for one hour and baked at 450° C. for two hours and provided as a sample catalyst SC-I. This sample catalyst SC-I contained Pt, Rh, Ba, K, Mg and Sr were 3.5 g/L of Pt, 0.1 g/L of Rh, 30 g/L Ba, 6 g/L of K, 10 g/L of Mg and 10 g/L of Sr.

Further, a comparative catalyst CC-I consisting of the same components as those of the sample catalyst I except that a ceria (CeO$_2$) powder was substituted for a Ce—Pr double oxide was prepared under the same condition as and in the same manner as applied to the sample catalyst SC-I.

A rig test was made in order to assess HC purifying performance of these sample and comparative catalysts. The rig test was carried out using gases A and B having the following compositions shown below.

|  | Gas A | Gas B |
|---|---|---|
| C$_3$H$_6$(HC) | 0 ppm | 553 ppm |
| CO | 0.2% | 0.2% |
| NO | 100 ppm | 100 ppm |
| C$_2$ | 1.0% | 1.0% |
| CO$_2$ | 15% | 15% |
| H$_2$O | 10% | 10% |

The rig test was carried out by running the gas B through a fixed bed flow-through type reactor with the catalyst attached subsequently to having run the gas A through the fixed bed flow-through type reactor at a room temperature for one minute and raising the temperature of the gas B at a rate of 30° C./min after a lapse of two minutes from a start of causing the gas B to flow. Measurements were made of a gas temperature at an inlet of the catalyst (an HC light-off temperature) when the gas B downstream from the catalyst lowered in HC concentration to 50% of the fresh gas B, in other words, when the catalyst dropped in HC purification efficiency to 50%.

Figure 2:
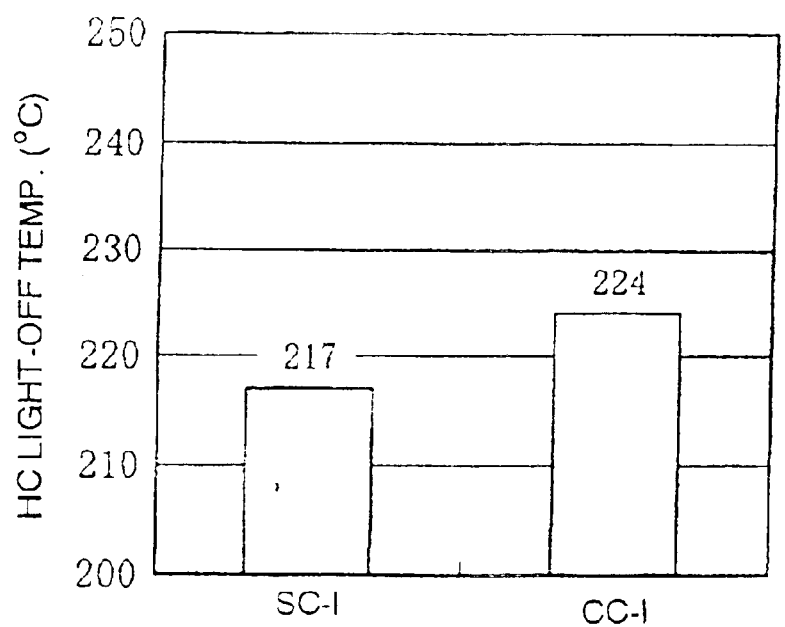
FIG. 2 is a graph showing HC purification light-off temperatures of a first sample catalyst and its comparative catalyst.

As apparent in FIG. 2 showing the result of the measurements, the sample catalyst SC-I is lower by approximately 7° C. in the HC light-off temperature on HC purification than the comparative catalyst CC-I. This proves that the use of a Ce—Pr double oxide as an oxygen absorption material causes the sample catalyst SC-I to increase HC purifying performance under lower gas temperatures.

EXAMPLE II

A sample catalyst SC-II was the same as the sample catalyst except that the under catalyst layer 27b comprising a Ce—Pr double oxide and the outer catalyst layer 27c comprising β-type zeolite were replaced each other such as to be an outer catalyst layer 27b and an under catalyst layer 27c. Further, a comparative catalyst CC-II was the same as the sample catalyst SC-II except that ceria was substituted for Ce—Pr double oxide.

The rig tests were made in order to assess HC purifying performance of these sample and comparative catalysts CC-II and CC-II in the same manner as described regarding the sample and comparative catalysts S-I and C-I.

Figure 3:
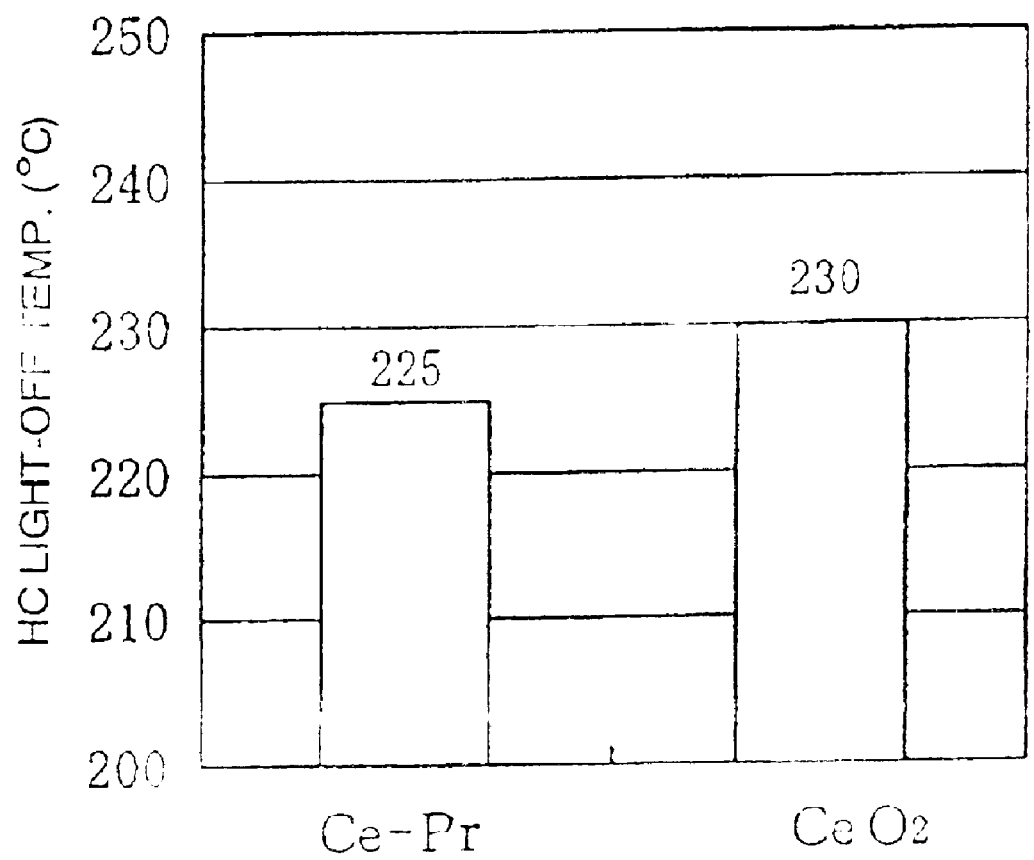
FIG. 3 is a graph showing HC purification light-off temperatures of a second sample catalyst and its comparative catalyst.

As apparent in FIG. 3 showing the result of measurements, the sample catalyst SC-II and the comparative catalyst CC-II are a little higher in the HC light-off temperatures on HC purification than the sample catalyst SC-I and the comparative catalyst CC-I, respectively. The sample catalyst SC-II is lower by approximately 5° C. in the HC light-off temperature on HC purification than the comparative catalyst CC-I. This also proves that the use of a Ce—Pr double oxide as an oxygen absorption material causes the sample catalyst SC-II to increase HC purifying performance under lower gas temperatures.

The inventors examined the suitability of various oxygen absorption materials for evaluation. Materials prepared for the evaluation and examination were Pr$_6$O$_{11}$ powder, Ce—Pr double oxide powder, Ce—Zr double oxide powder (double oxide containing Ce and Zr ions; weight ratio Ce:Zr=74:26) and CeO$_2$ (ceria). Each oxygen absorption material contained 5% of Pt and 0.5% of Rh in weight.

Figure 4:
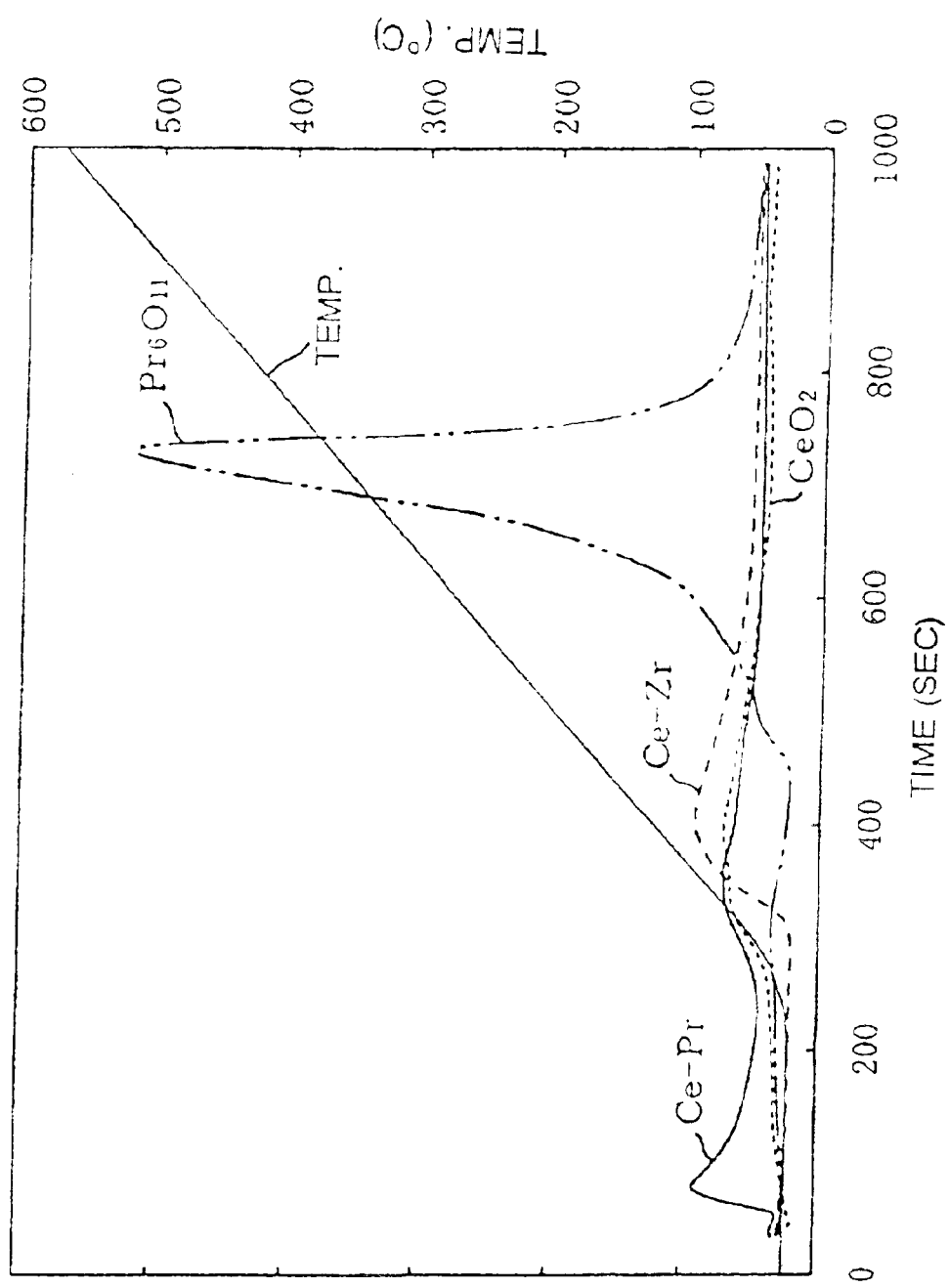
FIG. 4 is a graph showing oxygen absorption performance of $Pr_6O_{11}$ powder, Ce—Pr double oxide powder, Ce—Zr double oxide powder and $CeO_2$ powder.

FIG. 4 shows the result of measurements of amounts of H$_2$O released from the oxygen absorption materials when the temperature was raised from a room temperature while running hydrogen through the oxygen absorption material. The amount of H$_2$O was measured immediately downstream from the oxygen absorption material. As the result proves, the Ce—Pr double oxide powder is greater in the amount of released H$_2$O than the remaining powders in a temperature range between the room temperature and 100° C. The Pr$_6$O$_{11}$ powder starts releasing H$_2$O at approximately 250° C. and shows a peak, that is considerably greater than the remaining powders, in a temperature range between 300 and 400° C.

Figure 5:
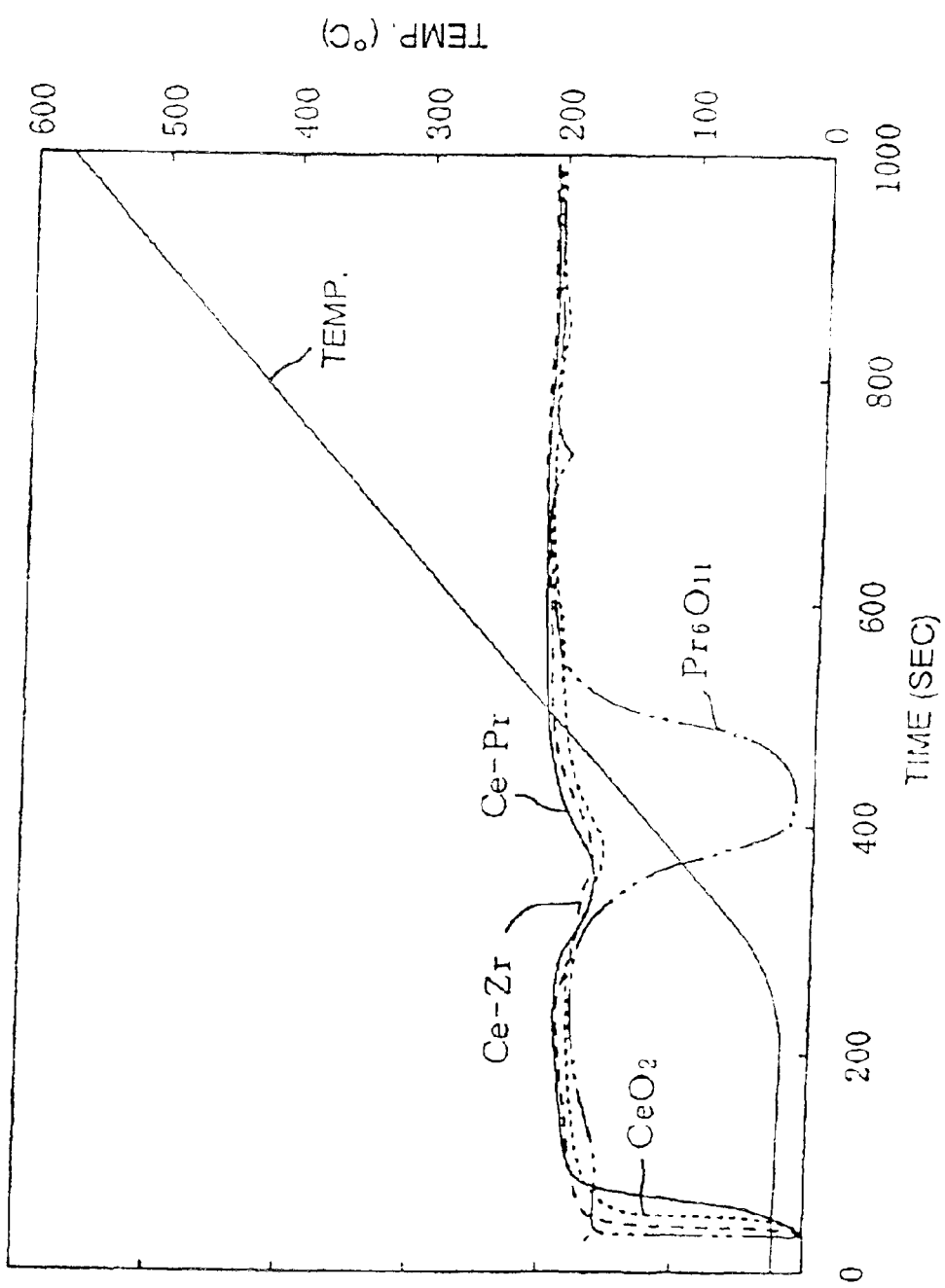
FIG. 5 is a graph showing hydrogen absorption performance of $Pr_6O_{11}$ powder, Ce—Pr double oxide powder, Ce—Zr double oxide powder and $CeO_2$ powder.

FIG. 5 shows the result of measurements of amounts of hydrogen absorbed in the oxygen absorption materials when the temperature was raised from a room temperature while hydrogen is run through the oxygen absorption material. As the result proves, the Ce—Pr double oxide powder is greater in the absorbed amount of hydrogen than the remaining powders at the room temperature. The Pr$_6$O$_{11}$ powder absorbs a large amount of hydrogen in a temperature range between 100 and 200° C.

Figure 6:
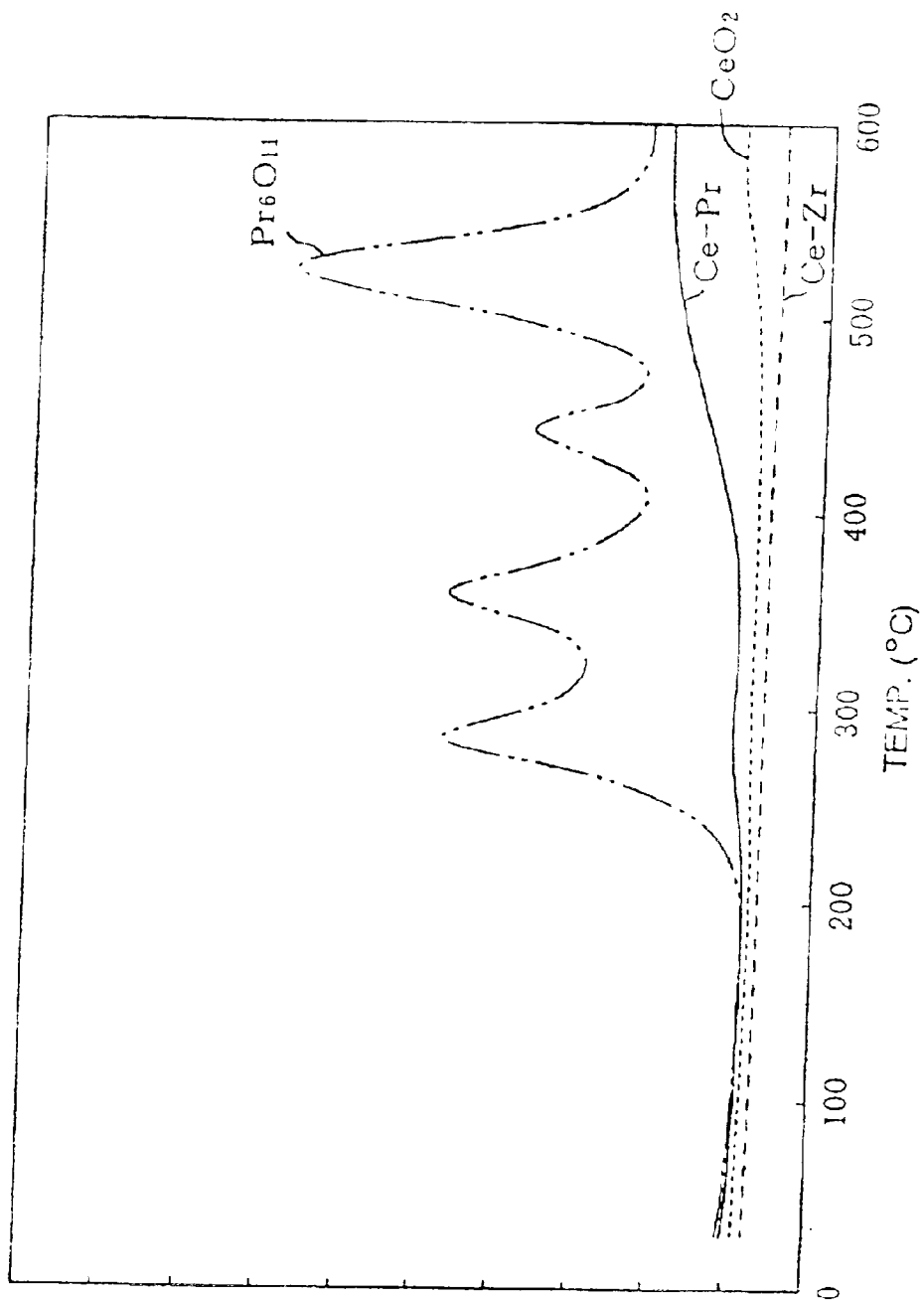
FIG. 6 is a graph showing oxygen absorption performance of $Pr_6O_{11}$ powder, Ce—Pr double oxide powder, Ce—Zr double oxide powder and $CeO_2$ powder.

FIG. 6 shows the result of measurements of amounts of O$_2$ absorbed in the oxygen absorption materials when the temperature was raised from a room temperature while an inert gas was run through the oxygen absorption material after the oxygen absorption material had been saturated with O$_2$. As the result proves, the Ce—Pr double oxide powder and the were Pr$_6$O$_{11}$ powder raise oxygen absorbing performance sufficiently enough to release oxygen due to a rise in temperature even though there is no assist of a reduction agent (hydrogen or oxygen). The results indicate that the Ce—Pr double oxygen and the Pr$_6$O$_{11}$ have high oxygen releasing performance under lower temperatures. This conceivably results in differences in the HC light-off temperature between the sample catalysts S-I and S-II and the comparative catalysts C-I and C-II.

Specifically, in the evaluation tests, the catalyst causes the Ce—Pr double oxygen in the case of the sample catalysts S-I and S-II or the ceria in the case of the comparative catalysts C-I and C-II to absorb oxygen in the gas A or B when the gas is run through the catalyst under a room temperature. The catalyst causes the β-type zeolite to trap HC in the gas A or B while the gas B is run through the catalyst. When raising the temperature while the gas B is run through the catalyst, the β-type zeolite starts releasing HC from near 150° C. In this case, the sample catalysts S-I and S-II release oxygen from the Ce—Pr double oxygen more than the comparative catalysts C-I and C-II, respectively.

Accordingly, the sample catalysts S-I and S-II promotes oxidization of released HC with higher efficiency by Pt and Rh than the comparative catalysts C-I and C-II. In particular, as oxygen that is released from the Ce—Pr double oxide after dissociative absorption is high in activity, the sample catalysts S-I and S-II promote oxidization of released HC with higher efficiency by Pt and Rh even in a temperature range between approximately 150° C. and approximately 250° C. that are comparatively low. For this reason, as shown in FIGS. 2 and 3, the sample catalysts S-I and S-II are conceivably lower in the HC light-off temperature on HC purification than the comparative catalysts C-I and C-II, respectively.

Figure 7:
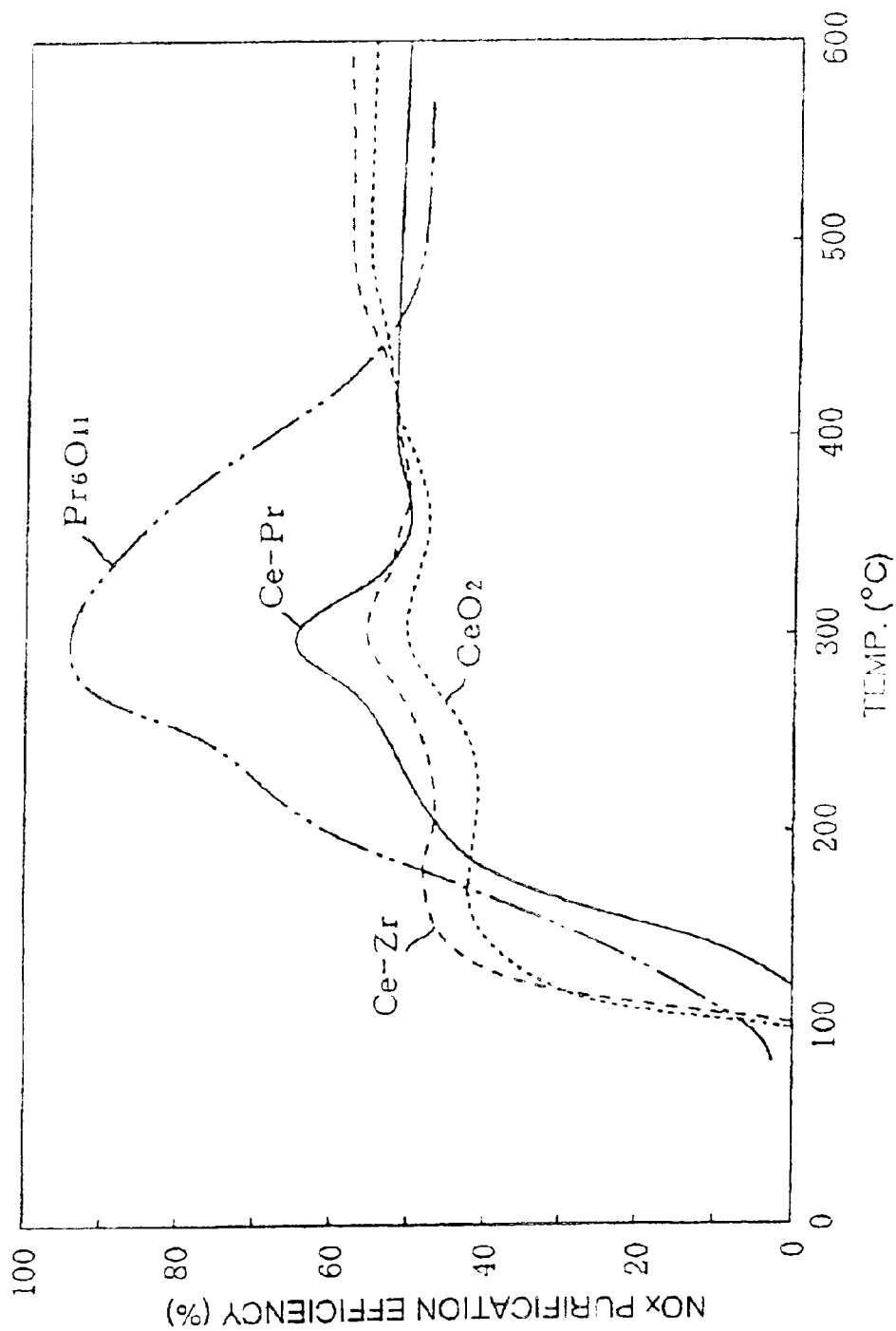
FIG. 7 is a graph showing an NO purification characteristic of $Pr_6O_{11}$ powder, Ce—Pr double oxide powder, Ce—Zr double oxide powder and $CeO_2$ powder through NO-hydrogen reaction.

FIG. 7 shows NOx purification efficiency of the oxygen absorption materials, Pr$_6$O$_{11}$, Ce—Pr double oxide, Ce—Zr double oxide and CeO$_2$, with regard to temperature when NO and hydrogen were run through. It is proved that the Ce—Pr double oxide has a peak of NOx purification efficiency at approximately 300° C. and the Pr$_6$O$_{11}$ has a peak of NOx purification efficiency at approximately 300° C. that is higher than that of the Ce—Pr double oxide.

Figure 8:
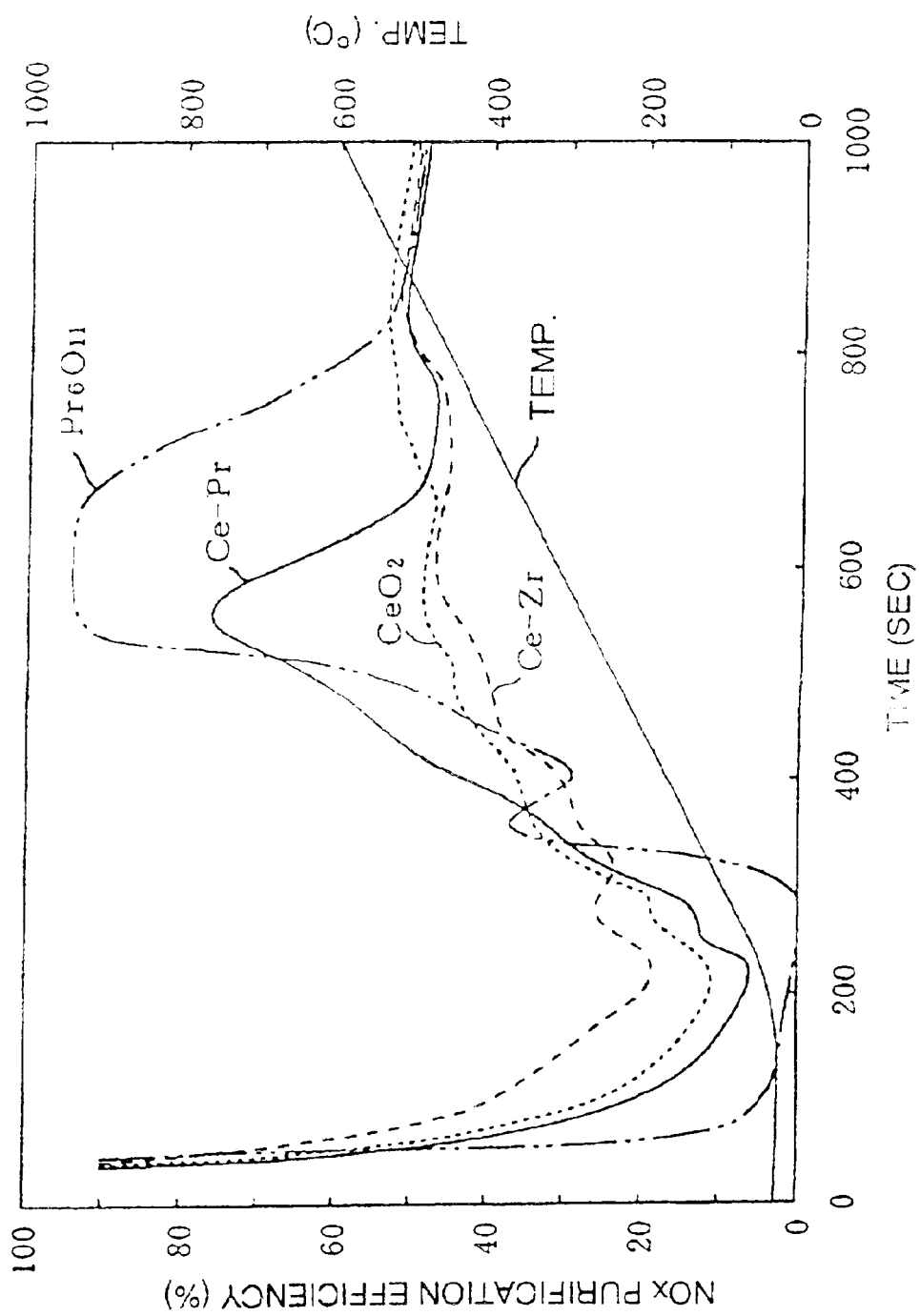
FIG. 8 is a graph showing an NO purification characteristic of $Pr_6O_{11}$ powder, Ce—Pr double oxide powder, Ce—Zr double oxide powder and $CeO_2$ powder through NO—CO reaction.

FIG. 8 shows NOx purification efficiency of the oxygen absorption materials, Pr$_6$O$_{11}$, Ce—Pr double oxide, Ce—Zr double oxide and CeO$_2$, with regard to a raise in temperature when NO and CO were run through. It is proved that the Ce—Pr double oxide has NOx purification efficiency that is high between approximately 150° C. and approximately 250° C. and the Pr$_6$O$_{11}$ has NOx purification efficiency that is high at approximately 300° C.

It is proved that the sample catalysts S-I and S-II have NOx purification efficiency higher than the comparative catalysts C-I and C-II from the results shown in FIGS. 7 and 8. Furthermore, it is proved from the results shown in FIGS. 4 to 8 that the Pr$_6$O$_{11}$ powder has high oxygen and hydrogen absorption performance under comparatively low temperatures. Therefore, even in the case where the Ce—Pr double oxide having Pr atoms greater than 10% is employed, the sample catalyst shows similar exhaust gas purification performance.

In order to examine a proper atom number ratio Ce:Pr in percentage, test catalysts TC-I to TC-III containing Ce—Pr double oxides different in Ce—Pr atom number ratio were prepared. That is, the test catalysts TC-I to TC-III had Pr atoms 10%, 90% and 95%, respectively. The test catalysts TC-I to TC-III were specifically prepared in the manner described below.

A slurry was prepared by stirring and mixing a water solution of a mixture consisting of a β-type zeolite powder having a silica ratio (a ratio of SiO$_2$ to Al$_2$O$_3$) of 300 and a hydrate alumina binder powder added with nitric acid in a disperser. A honeycomb substrate was dipped in the slurry at a room temperature and then pulled out of the slurry. A desired amount of the slurry was coated on the honeycomb substrate by repeatedly blowing off an excess part of the slurry and drying the slurry at 200° C. so as to form an under catalyst layer containing 160 g/L of the β-type zeolite. The under catalyst layer on the honeycomb substrate was baked at 500° C. for two hours.

Subsequently, a slurry was prepared by stirring and mixing an ion exchanged water solution of a mixture consisting of an active alumina powder a Ce—Pr double oxide powder at a weight ratio of 3:1 and was added with drops of an ion exchanged water solution of palladium nitrate. The slurry was dried and baked at 500° C. for two hours so as thereby to prepare a Pd carried catalyst powder (a three-way catalyst). Further, a slurry was prepared by stirring and mixing a water solution of a mixture of the Pd carried catalyst powder and a zirconia binder powder added with nitric acid in the disperser. A desired amount of the slurry was coated over the under catalyst layer on the honeycomb substrate and dried and baked at 500° C. for tow hours so as to form an outer catalyst layer comprising 105 g/L of the Pd carried catalyst containing 3.0 g/L of Pd.

The under and upper catalyst layers were impregnated with a mixture solution of an ion exchanged water solution of silver nitrate and an acetate solution of bismuth acetate and thereafter dried at 200° C. for tow hours and then baked at 500° C. for tow hours so as to complete a test catalyst. Each test catalyst TC-I, TC-II, TC-III contained 10 g/L of Ag and 0.5 g/L of Bi.

Evaluation was made on the basis of the temperature dependency of HC, CO and NOx purification performance in order to assess light-off performance of these test catalysts TC-I, TC-II and TC-III that were different in Ce—Pr atom number ratio or in as was previously described. Before testing, the respective test catalysts were subjected to an aging treatment by being left in a nitrogen gas containing water vapors at 800° C. for 12 hours. The evaluation test was carried out by raising a temperature of a simulated exhaust gas at an inlet of the test catalyst (an exhaust gas inlet temperature) at a rate of 30° C./min from a room temperature to 500° C. while running a simulated exhaust gas through a fixed bed flow-through type reactor with the test catalyst attached thereto. The simulated exhaust gas run as a stationary main stream equivalent to an air-fuel ratio of 14.7 at a spatial velocity of 60,000 $h^{-1}$ and is intermittently added with a supplemental gas on a frequency of 1 Hz so as to compulsorily oscillate the air-fuel ratio on amplitudes of ±0.9 in air-fuel ratio. The simulated gas was added with $O_2$ when shifting the air-fuel ratio toward a lean side and $H_2$ and CO when shifting the air-fuel ratio toward a rich side.

Figure 9:
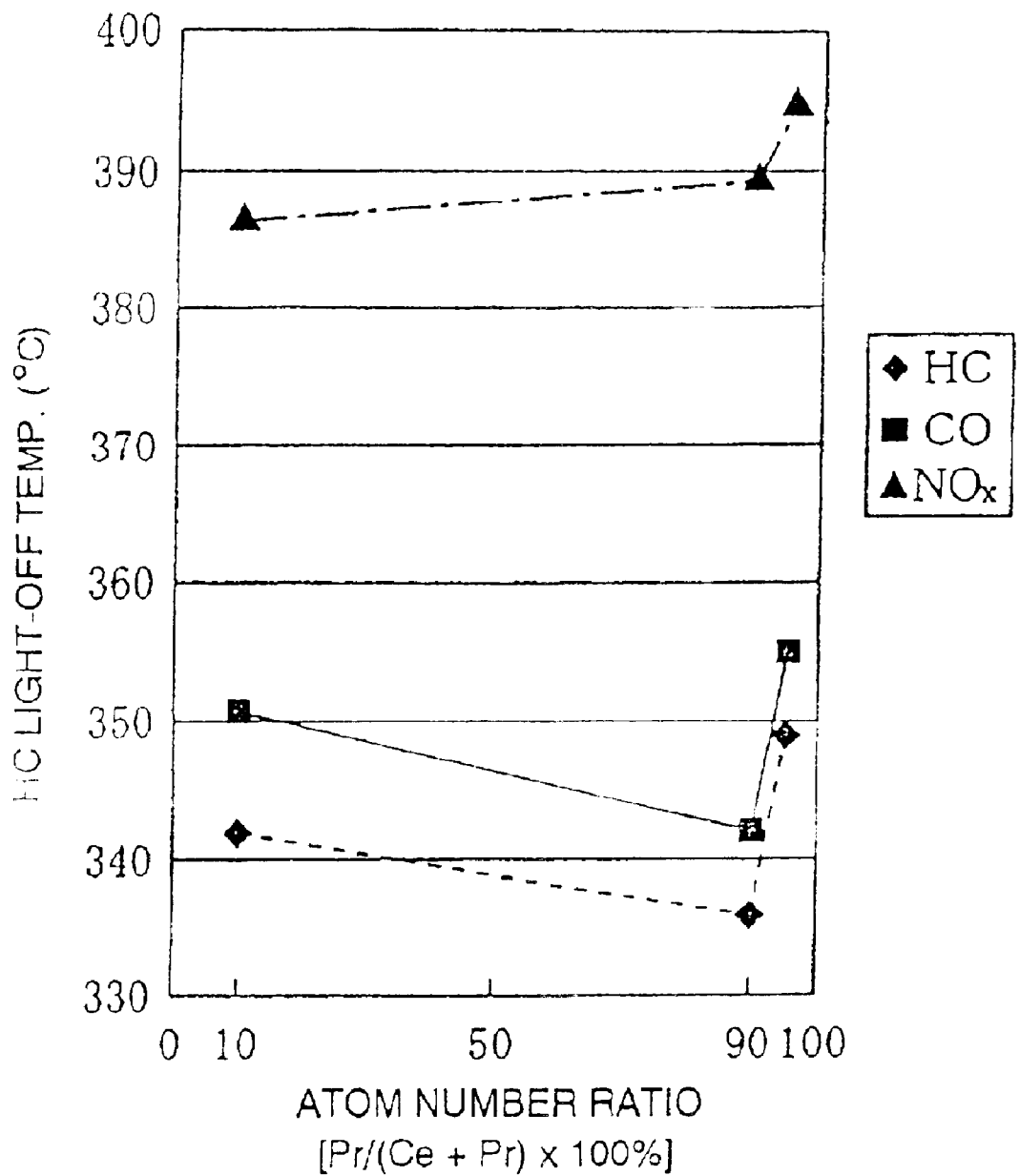
FIG. 9 is a graph of HC, CO and NOx purification light-off temperatures with respect to atom number ratio.
Figure 10:
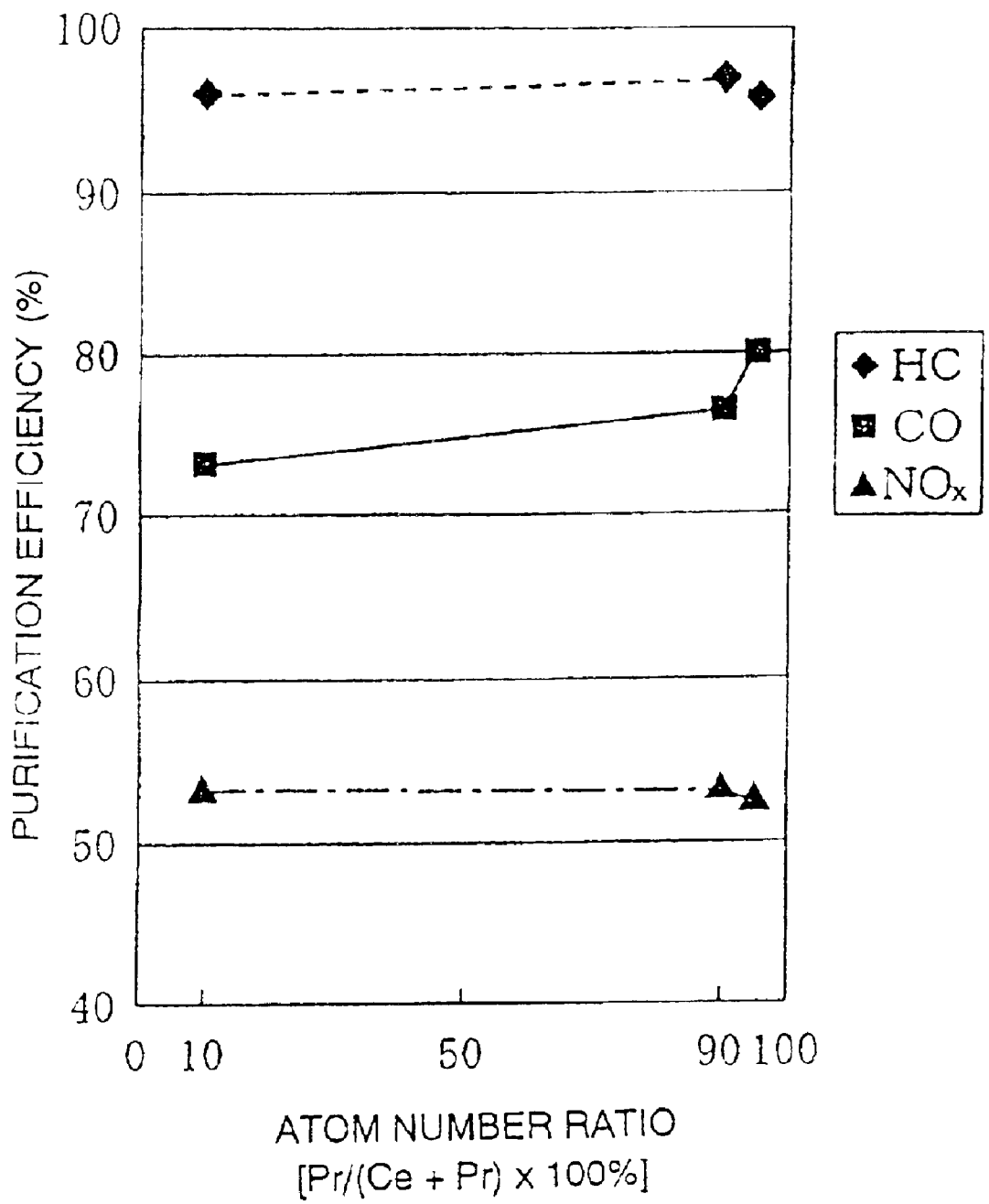
FIG. 10 is a graph of HC, CO and NOx purification efficiency with respect to atom number ratio.

FIG. 9 shows light-off temperatures of HC, CO and NOx that are obtained on the basis of HC, CO and NOx purification efficiency. FIG. 10 shows HC, CO and NOx purification efficiency at an exhaust gas inlet temperature of 400° C. It is apparent in FIG. 9 that the test catalyst TC-II having the Pr content of 90% is superior in HC and CO light-off performance to the remaining test catalysts TC-I and TC-III and an increase in the Pr content improves NOx light-off performance.

It is also apparent in FIG. 9 that the test catalyst is improved in NOx purification efficiency as the Pr content becomes greater. It is concluded that the test catalyst TC-II having the Pr content of 90% is most desirable in the light-off performance from a general point of view.

It is apparent in FIG. 10 that, though the HC and NOx purification efficiency are conceivably independent from Pr contents, the CO purification efficiency is raised with an increase in the Pr content.

A rig test was made in order to examine HC absorption efficiency, HC oxidation efficiency (a ratio of oxidized HC relative to absorbed HC) and HC purification efficiency (HC absorption efficiency×HC oxidation efficiency) of the test catalyst after the aging treatment. The assessment mode for the HC purification performance was comprised of the steps of (1) raising an inlet temperature of an $N_2$ gas in which the test catalyst TC-I, TC-II, TC-III was put to 80° C.; (2) introducing HC, NO and $O_2$ gases into the $N_2$ gas for one minute so as to have a HC content of 1500 ppm, an NO content of 100 ppm and an $O_2$ content of 1.0% while the $N_2$ gas kept at the inlet temperature of 80° C.; and (3) subsequently stopping the introduction of the HC gas into the $N_2$ gas and raising the inlet temperature of the $N_2$ gas from 80° C. to 400° C. at a rate of 30° C./min. The $N_2$ gas was run at a spatial velocity of 25,000 $h^{-1}$. The HC absorption efficiency was calculated on the basis of inlet and outlet HC concentrations of the $N_2$ gas (HC concentrations of the $N_2$ gas at inlet and outlet of the test catalyst) in a period of one minute in the step (2). The HC oxidation efficiency was calculated on the basis of an amount of HC absorbed in the test catalyst in one minute in the step (2) and an outlet HC concentration of $N_2$ gas in the step (3). The result is shown in FIG. 11.

Figure 11:
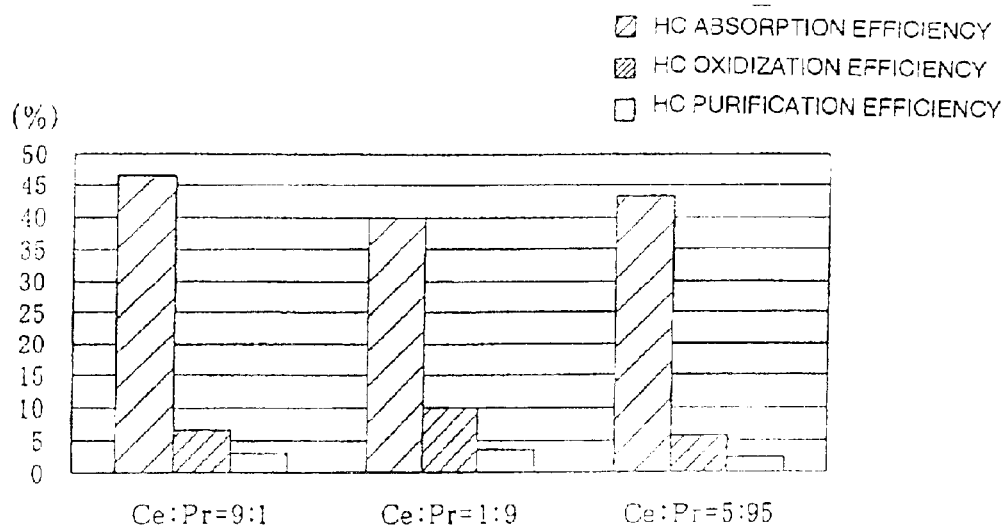
FIG. 11 is a graph of HC absorption efficiency, HC oxidization efficiency, and HC purification efficiency with respect to Ce—Pr weight ratios.

As apparent in FIG. 11, although the test catalyst TC-I that has the Pr content of 10% shows the heist HC absorption efficiency, the test catalyst TC-II that has the Pr content of 90% has the heist HC oxidation efficiency and is conceivably superior in total HC purification efficiency to the remaining test catalyst TC-I and TC-III. It is evaluated on the basis of the light-off performance, the high temperature purification efficiency and the HC absorption and purification performance from a general point of view that materials usable for the Ce—Pr double oxide desirably have Pr contents in a range between 10% and 95% and more desirably have Pr contents in a range between 50% and 95%.

In light of the fact that, in the sample catalysts S-I to S-III, the active alumina and the Ce—Pr double oxide work as a support material for a catalytic metal. In order to examine a proper weight content of active alumina (a percentage of the weight of active alumina relative to the total weight of active alumina and Ce—Pr double oxide), test catalysts TC-IV to TC-VII different in weight ratio were prepared. That is, the test catalysts TC-IV to TC-VII had alumina weight contents of 20%, 50%, 75% and 100%, respectively. The test catalysts TC-IV to TC-VII were specifically prepared in the manner described below.

A slurry was prepared by stirring and mixing a water solution of a mixture consisting of a β-type zeolite powder having a silica ratio (a ratio of $SiO_2$ to $Al_2O_3$) of 300 and a hydrate alumina binder powder added with nitric acid in a disperser. A honeycomb substrate was dipped in the slurry at a room temperature and then pulled out of the slurry. A desired amount of the slurry was coated on the honeycomb substrate by repeatedly blowing off an excess part of the slurry and drying the slurry at 200° C. so as to form an under catalyst layer containing 160 g/L of the β-type zeolite. The under catalyst layer on the honeycomb substrate was baked at 500° C. for two hours.

Subsequently, a slurry was prepared by stirring and mixing an ion exchanged water solution of a mixture consisting of an active alumina powder a Ce—Pr double oxide powder at a given alumina weight content and was added with drops of an ion exchanged water solution of palladium nitrate. The slurry was dried and baked at 500° C. for two hours so as thereby to prepare a Pd carried catalyst powder (a three-way catalyst). Further, a slurry was prepared by stirring and mixing a water solution of a mixture of the Pd carried catalyst powder and a zirconia binder powder added with nitric acid in the disperser. A desired amount of the slurry was coated over the under catalyst layer on the honeycomb substrate and dried and baked at 500° C. for tow hours so as to form an outer catalyst layer comprising 105 g/L of the Pd carried catalyst containing 5.7 g/L of Pd.

The under and upper catalyst layers were impregnated with an ion exchanged water solution of silver nitrate and thereafter dried at 200° C. for tow hours and then baked at 500° C. for tow hours so as to complete a test catalyst. Each test catalyst TC-IV, TC-V, TC-VI, TC-III contained 10 g/L of Ag.

In order to evaluate HC purification performance of the test catalysts TC-IV, TC-V, TC-VI and TC-III, measurements were made of the amount of HC emission from the test catalyst installed in an exhaust pipe placed under a flower of a vehicle and subjected to bench aging in the FPT test mode defined by U.S. Environmental Protection Agency. The bench aging was carried out by operating an engine with a high load for 24 hours so that the exhaust gas inlet temperature reached 800° C.

Figure 12:
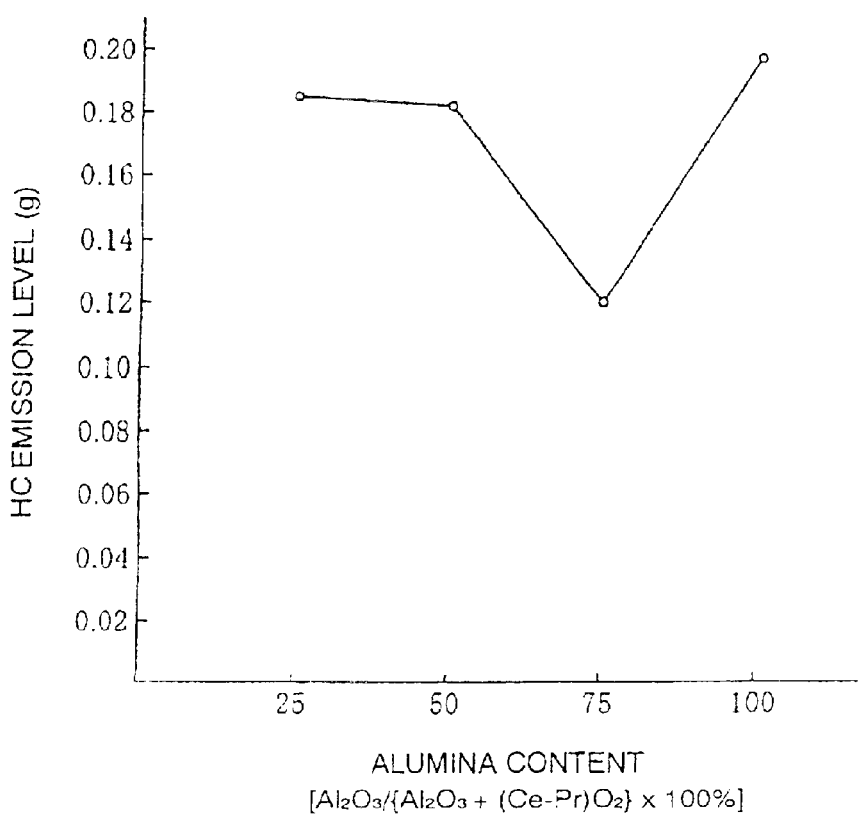
FIG. 12 is a graph of the relationship between HC emission and active alumina content.

As apparent in FIG. 12 showing the result of measurements, the Amount of HC emission is different according to the alumina weight content. Specifically, the test catalyst TC-VI having the alumina weight content of 75% shows the smallest amount of HC emission for 152 seconds from a start of measurement. This fact indicates that the test catalyst TC-VI having the alumina weight content of 75% was superior in cold HC purification efficiency to the remaining test catalysts TC-IV, TC-V and TC-VII.

Furthermore, although the Ce—Pr double oxide effectively works in oxidizing purification of HC by means of high active oxygen released therefrom, the test catalyst TC-VI that contains the Ce—Pr double oxide larger in amount than the alumina (i.e. the alumina weight content is 75%) shows the amount of HC emission smaller than the test catalysts TC-IV and TC-V that contains the Ce—Pr double oxide smaller in amount than the alumina (i.e. the alumina weight content are 25% and 50%, respectively). This conceivably results from that the test catalyst TC-VI having the alumina weight content of 75% showed the smallest amount of HC emission in a period of time between 51 seconds and 152 second from a start of measurement as compared with the remaining test catalysts TC-IV, TC-V and TC-VII. This fact conceivably indicates that the test catalyst TC-VI having the active alumina weight content of 75% was superior in the light-off performance to the alumina weight content is 75%.

On the other hand, the test catalyst TC-VII containing the active alumina only (i.e. the alumina weight content was 100%) was inferior in the light-off performance to the remaining test catalysts TC-IV, TC-V and TC-VI. This fact conceivably indicates that Pd was highly dispersed due to a proper amount of the Ce—Pr double oxide in the test catalyst TC-VI. Therefore, the test catalyst TC-VI having the alumina weight content of 75% was improved in the light-off performance resulting from the effect of highly dispersed Pd and high active oxygen released from the Ce—Pr double oxide and as a result, lowered a total amount of HC emission for 150 seconds.

It is also apparent in FIG. 12, the alumina weight content of the catalyst is conceivably desirable between 60% and 90% in the viewpoint of an enhanced effect of lowering an amount of HC emission and is more desirable between 70% and 80%.

FIG. 13 shows a direct-injection gasoline engine (which is hereafter referred to as an engine for simplicity) 1 equipped with an exhaust gas purifying catalyst according to an embodiment of the present invention. The engine 1 has a plurality of cylinders 2 (only one cylinder is shown) in which pistons 3 are received for reciprocal movement. A combustion chamber is formed between the cylinder 2 and the piston 3. The engine 1 is provided with spark plugs 6, one for each cylinder 2, that are disposed right above the combustion chambers 4, respectively and electrically connected to an ignition circuit 5.

The engine 1 is further provided with fuel injectors 7, one for each cylinder 2, that are disposed close to the combustion chambers 4, respectively. Fuel from a fuel tank (not shown) is regulated in pressure level by and supplied to the fuel injector 7 through a fueling system (not shown) including at least a high pressure fuel pump and a pressure regulator. The fueling system is provided with a pressure sensor 8. The combustion chamber 4 is in communication with an intake passage 10 through two intake ports of each cylinder that are opened and closed by intake valves 9 at appropriate timings, respectively. The intake passage 10 is provided with an air cleaner 11, an air flow sensor 12, a throttle valve 13 and surge tank 14 arranged in this order from the upstream end. The throttle valve 13 is driven not by an accelerator pedal (not shown) but by a throttle actuator 15 such as an electric motor to variably open or close the intake passage 10. The intake passage 10 is further provided with a position sensor 16 operative to monitor a position of the throttle valve 13 and a pressure sensor 17 operative to monitor a pressure of air introduced into the surge tank 14.

The intake passage 10 after the surge tank 14 is branched off into discrete intake passages, one for each cylinder 2. Each discrete passage at its downstream portion is branched off into two passages leading to two intake ports of the cylinder 2, respectively. Either one of the two intake passages for each cylinder 2 is provided with a swirl valve 18 that is provided with a valve position sensor 20 and driven by an actuator 19. When the swirl valve 18 is closed, the amount of air introduced into the combustion chamber 4 through another intake passage is increased according to a closed position of the swirl valve 18, so as thereby to cause a strong swirl in the combustion chamber 4.

The combustion chamber 4 is in communication with an exhaust passage 22 through two exhaust ports of each cylinder that are opened and closed by intake valves 21 at appropriate timings, respectively. The intake passage 10 at its upstream portion is branched off into discrete intake passages, one for each cylinder 2. Each discrete passage at its upstream portion is further branched off into two passages leading to the two intake ports of the cylinder 2, respectively. The exhaust passages 22 is provided with a first oxygen concentration sensor 24 operative to monitor an oxygen concentration of an exhaust gas, a three-way catalyst 25 operative to purify HC, CO and NOx in the exhaust gas, a second oxygen concentration sensor 26 operative to monitor an oxygen concentration of an exhaust gas having passed through the three-way catalyst 25, an HC trapping catalyst 27 operative to trap and purify HC in an exhaust gas during cold operation of the engine 1, and a third oxygen concentration sensor 28 operative to monitor an oxygen concentration of an exhaust gas having passed through the HC trapping catalyst 27 arranged in this order from the upstream end.

The oxygen concentration of an exhaust gas that is monitored by the oxygen concentration sensor 24, 26 or 28 is used as a substitute value to an air-fuel ratio of an air-fuel mixture supplied into the combustion chamber 4. While each of the oxygen concentration sensor 24, 26 and 28 is, in this embodiment, of a λ-type that provides an output that turns over between opposite sides of a stoichiometric air-fuel ratio, i.e. between rich and lean air-fuel ratios, it may be of a linear type that provides an out put changing linearly according to an air-fuel ratio.

The engine 1 is provided with an exhaust gas recirculation (EGR) passage 29 that is connected to the exhaust passage 22 upstream from the first oxygen concentration sensor 24 and the intake passage 10 between the throttle valve 13 and the surge tank 14 so as to admit an exhaust gas partly recirculated into the intake passage 10. The EGR passage 29 is provided with an electrically controlled exhaust gas recirculation (EGR) control valve 30 operative to control the amount of exhaust gas admitted into the intake passage 10 according to a lift position of the EGR control valve 30 that is detected by a valve position sensor 31. The engine 1 is further provided with a secondary air passage 32 connected to the exhaust passage 22 between the three-way catalyst 25 and the HC trapping catalyst 27 and the intake passage 10 between the air flow sensor 12 and the throttle valve 13. The secondary air passage 32 is provided with a check valve 33 controlled in operation according to a signal from an engine control unit (ECU) 34 comprising a microcomputer.

The engine 1 is further equipped with various sensors including at least a temperature sensor 36 operative to monitor an intake air pressure, a pressure sensor 37 operative to monitor an atmospheric pressure, a speed sensor 38 operative to monitor a speed of rotation of the engine 1 and a position sensor 39 operative to detect of a position of an accelerator pedal.

The ECU 34 receives signals from various sensors including the air flow sensor 12, the throttle position sensor 16, the pressure sensor 17, the valve position sensor 20, the first to third oxygen concentration sensors 24, 26 and 28, the valve position sensor 31, the temperature sensor 36, the pressure sensor 37, the speed sensor 38 and the position sensor 39. The ECU 34 is provided with various functional means including at least fuel injection control means 40 for controlling fuel injection through the fuel injector 7 according to engine operating conditions, ignition control means 41 for controlling ignition of an air-fuel mixture by providing the spark plug 6 with a controlled ignition signal, an HC monitor means 42 for monitoring a level of HC released from the HC trapping material of the HC trapping catalyst 27 and an air-fuel ratio control means 43, i.e. an oxygen concentration control means, for controlling a mean air-fuel ratio of air-fuel mixture in the combustion chamber (which is hereafter referred to as a combustion chamber mean air-fuel ratio) according to the level of HC so as thereby to control an oxygen concentration of exhaust gas.

The fuel injection control means 40 controls fuel injection differently between cold engine operation and warm engine operation and between an engine operating range for stratified charge combustion and an engine operating range for homogeneous charge combustion. Specifically, in the stratified charge combustion range during warm engine operation, the fuel injection control means 40 causes the fuel injector 7 to spray a given amount of fuel all at once in a specified period of a compression stroke so as thereby to provide an air-fuel mixture as lean as approximately 30 (A/F) in the entire area of the combustion chamber 4 and, on the other hand, to cause an over rich air-fuel mixture locally around the spark plug 6. On the other hand, in the homogeneous charge combustion during warm engine operation, the fuel injection control means 40 causes the fuel injector 7 to spray a given amount of fuel all at once in an intake stroke so as thereby to provide a homogeneous air-fuel mixture in the combustion chamber 4 with a combustion chamber mean air-fuel ratio of 14.7 (a stoichiometric air-fuel ratio) in the entire area of the combustion chamber 4.

Further, during cold engine operation the fuel injection control means 40 causes the fuel injector 7 to spray a given amount of fuel all in a split injection mode in a period from an intake stroke to a compression stroke. Specifically, in the split injection mode, the fuel injection control means 40 divides a given amount of fuel into two parts for early fuel injection and later fuel injection and cause the fuel injector 7 to spray the given amount of fuel through the fuel and later fuel injection in a period from an intake stroke to a compression stroke. That is, the fuel injector 7 is caused to spray fuel through the early fuel injection before the middle of the compression stroke and through the later fuel injection after the middle of the compression stroke. Fuel injection in the split injection mode may be performed in an over all range of engine operation, or otherwise may be performed in an intake period only while the engine is under high engine load.

The ignition control means 41 provides the ignition circuit 5 with an ignition timing signal with which an ignition timing is controlled according to an engine operating condition. The ignition control means 41 basically performs ignition control so as to make ignition at a timing for minimum advance for best torque (an MBT timing) and, however, at a timing retarded from the MBT timing when the fuel injector 7 is controlled to spray fuel in the split injection mode during cold engine operation and the level of HC released from HC trapping material of the HC trapping catalyst 27 is high.

The HC monitor means 42 monitors an HC release engine operating condition, in other words, whether an engine operating condition is in a range in which the CH trapping material of the HC trapping catalyst 27 is caused to release HC. This monitoring is performed by comparing a temperature of the HC trapping catalyst 27 that is estimated on the basis of a lapse of time since an engine start and a record of engine operation with a predetermined standard temperature. The HC release engine operating condition may be determined on the basis of an oxygen concentration monitored by the third oxygen concentration sensor 28 lower than a specified level.

The air-fuel ratio control means 43 controls the amount of fuel injection or the amount of intake air so as to bring the oxygen concentration of exhaust gas contacting the HC trapping catalyst 27 to lower-than-0.3%, desirably lower than 0.1% when the temperature of the HC trapping catalyst 27 raises sufficiently enough to release HC while the engine is still cold such as immediately after an engine start. That is, in the case where a target air-fuel ratio should be fixed, the combustion chamber mean air-fuel ratio is set lower than 14.9, desirably lower than 14.7 and more desirably between 14.0 and 14.5. In this case, the oxygen concentration of exhaust gas is approximately 0.3% when the combustion chamber mean air-fuel ratio is 14.9 and approximately 0.03% (theoretically 0%) when the combustion chamber mean air-fuel ratio is 14.7.

On the other hand, in perturbation control where the target air-fuel ratio should be shifted, the combustion chamber mean air-fuel ratio is set lower than 14.6 and more desirably between 13.5 and 14.5 and the target are-fuel ratio is altered toward opposite sides on the combustion chamber mean air-fuel ratio so as to bring the oxygen concentration of exhaust gas to lower-than-0.3%. In this case, when making the target air-fuel ratio small, the combustion chamber mean air-fuel ratio is approximately 14.6 in order to bring the oxygen concentration of exhaust gas to lower-than-0.3%. However, when making the target air-fuel ratio large, the combustion chamber mean air-fuel ratio is desirable to be lower than 14.6 in order to bring the oxygen concentration of exhaust gas to lower-than-0.3%. This air-fuel ratio control is performed through feedforward control of the amount of fuel injection or the amount of intake air or feedback control of the amount of fuel injection or the amount of intake air on the basis of an oxygen concentration of exhaust gas monitored by the second oxygen concentration sensor 26.

As a result of the control of the amount of fuel injection or the amount of intake air, feedforward or feedback, it is come off to release oxygen that has been absorbed in the Ce—Pr double oxide of the HC trapping catalyst 27. In this connection, the average oxygen concentration of exhaust gas that is controlled in general air-fuel ratio control using a combustion chamber mean air-fuel ratio of 14.7 is approximately 0.5%.

When an exhaust gas entering the HC trapping catalyst 27 contains oxygen lower than 0.3% in concentration, the Ce—Pr double oxide of the HC trapping catalyst 27 is apt hardly to release oxygen. On the other hand, when making the combustion chamber mean air-fuel ratio lower than 13.5, an exhaust gas entering the HC trapping catalyst 27 contains oxygen 0% in concentration, so that, while the Ce—Pr double oxide of the HC trapping catalyst 27 promotes a release of oxygen, a level of HC emission into the atmosphere raises since the amount of reducing gases containing HC and CO from the engine 1 is increased and the HC trapping material of the HC trapping catalyst 27 releases HC In the event where the three-way catalyst 25 is highly activated, while an exhaust gas contains oxygen greater than 0.3% in concentration, the three-way catalyst 25 consumes oxygen for oxidization of HC and CO.

Accordingly, in such the case, even thought the combustion chamber mean air-fuel ratio is set higher than 14.6 but desirably lower than 15.5 and more desirably lower than 15.0, the exhaust gas into the HC trapping catalysts 27 contains oxygen lower than 0.3% in concentration. As will be described later, the air-fuel ratio control described above can purify HC efficiently while the HC trapping material of the HC trapping catalyst 27 releases HC by causing the Ce—Pr double oxide of the HC trapping catalyst 27 to release oxygen.

The air-fuel ratio control that is implemented in order to lower the oxygen concentration of exhaust gas can be performed by implementing the feedforward control of the amount of fuel injection or the amount of intake air so as to deliver a target air-fuel ratio or implementing the feedback control of the amount of fuel injection or the amount of intake air on the basis of an oxygen concentration of exhaust gas monitored by the second oxygen concentration sensor 26 so as to deliver a target air-fuel ratio. When the engine operating condition for releasing HC from the HC trapping material of the HC trapping catalyst 27 disappears resulting from a termination of releasing HC, the air-fuel ratio control terminates the control of lowering the oxygen concentration of exhaust gas and shifts to the ordinary control, i.e. the feedback control of the amount of fuel injection according to an engine operating condition.

Figure 14A:
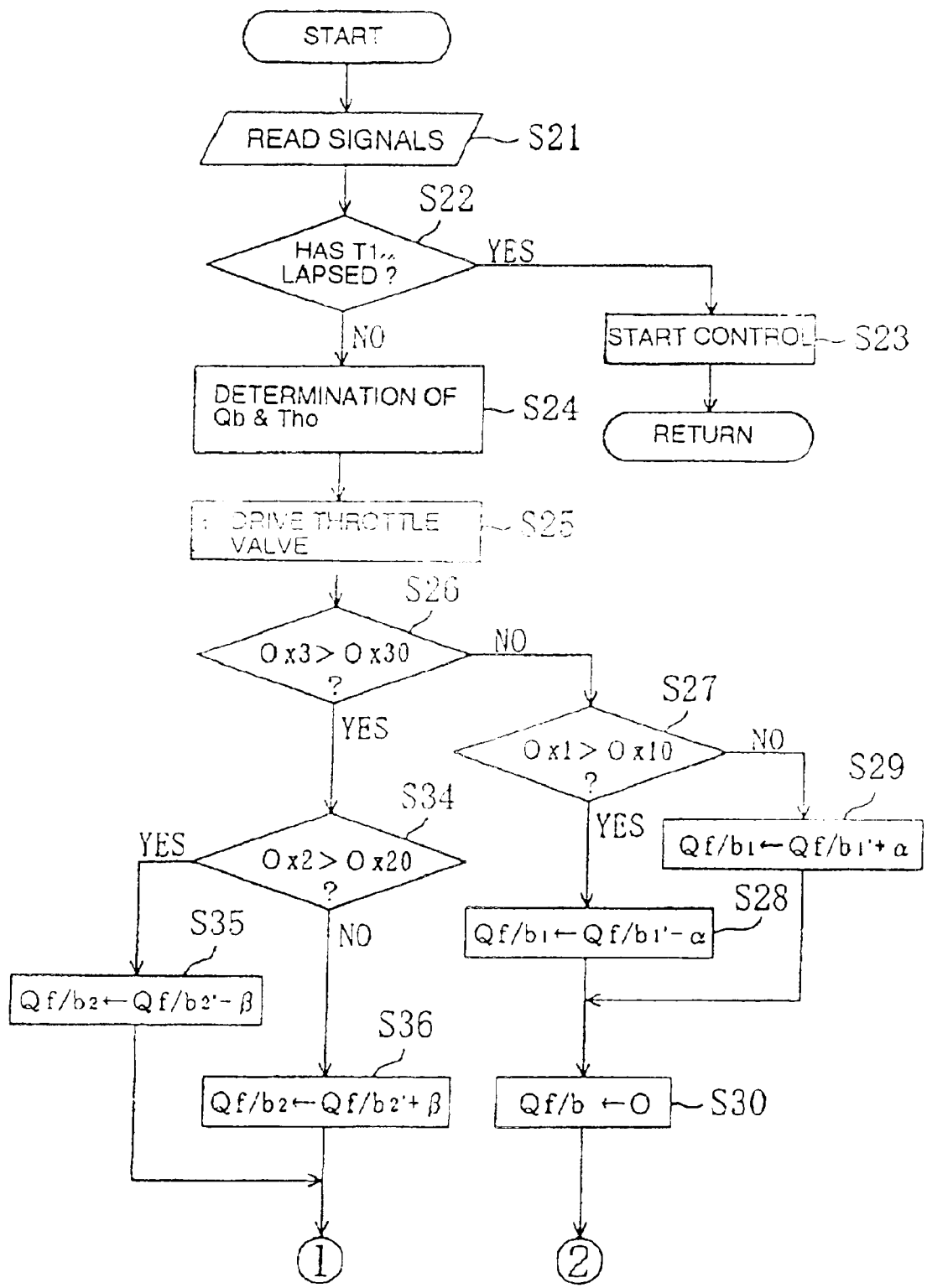
FIGS. 14A and 14B are respective parts of a flow chart illustrating a sequence routine of air-fuel ratio control for the direct injection type gasoline engine.
Figure 14B:
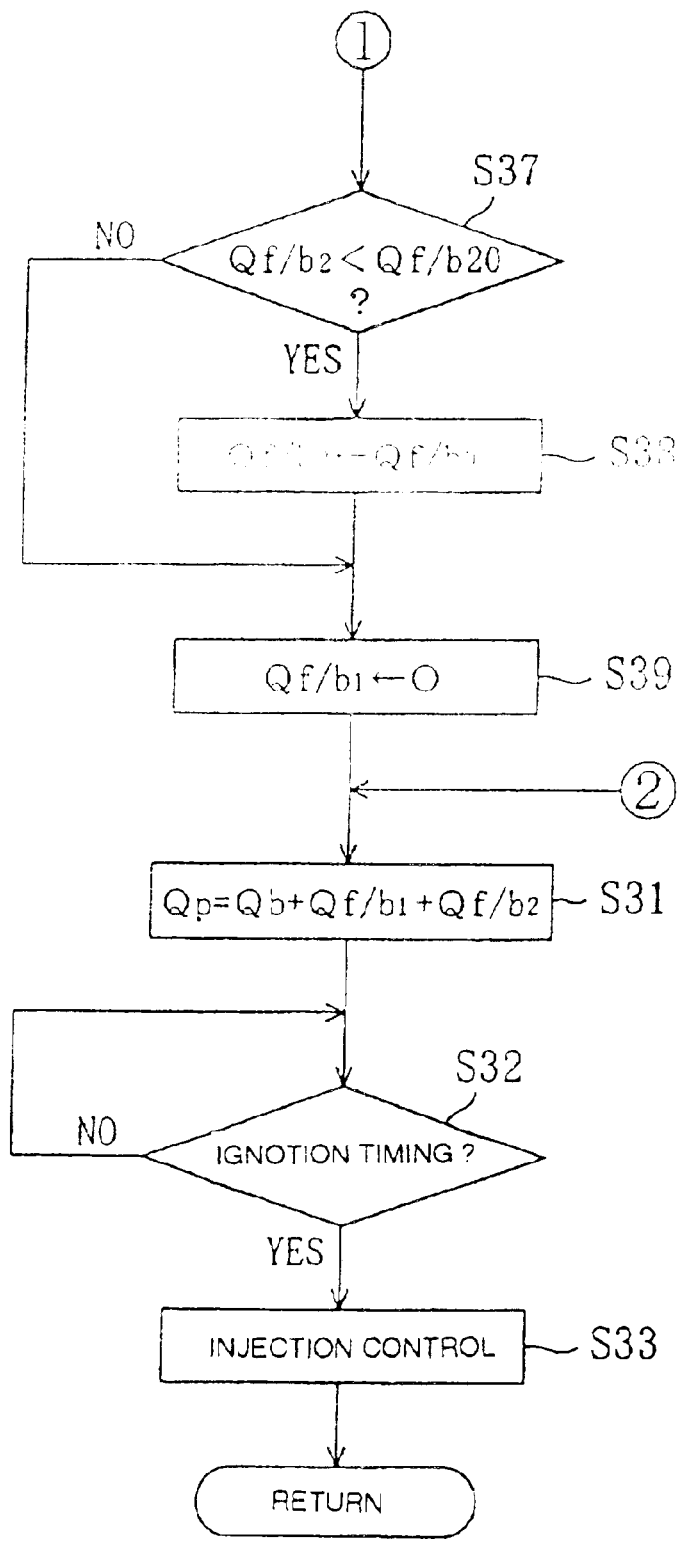

FIGS. 14A and 14B show respective parts of a flow chart illustrating a sequence routine of the air-fuel ratio control for a microcomputer of the ECU 34. Programming a computer is a skill well understood in the art. The following description is written to enable a programmer having ordinary skill in the art to prepare an appropriate program for the microcomputer. The particular details of any such program would of course depend upon the architecture of the particular computer selected.

In the air-fuel control, a judgment as to whether an engine operating condition is in a range in which HC is released from the HC trapping material of the HC trapping catalyst 27 is made not by the HC monitor means 42 but on the basis of the oxygen concentration of exhaust gas monitored by the third oxygen concentration sensor 28.

Referring to FIG. 14A, when the sequence logic commences and control proceeds to a function block at step S21 where signals from various sensors are input. Subsequently, a judgment is made at step S22 as to whether the engine 1 is immediately after a start, in other words, whether a specified preparatory time, for example three to five seconds, has lapsed since turn-on operation of an ignition switch. When the preparatory time T1 has passed, the sequence logic proceeds to a function block at step S23 where the air-fuel ratio control implements a start control that makes an air-fuel ratio rich so as to increase combustion stability and opens the throttle valve 13 to a specified position.

When it is before a lapse of the preparatory time T1, a basic amount of fuel injection Qb and a basic throttle opening Tho are determined on the basis of a target engine output torque and an engine speed at step S24. The determination is made with reference to a control map electronically stored in the ECU 34 which defines basic fuel injection amounts Qb and throttle openings Tho with respect to target engine output torque and engine speed. The target engine output torque is determined on the basis of a position of the accelerator pedal and an engine speed with reference to a control map electrically stored in the ECU 34 that defines target engine output torque with respect to accelerator position and engine speed. Subsequently, the throttle actuator 15 is driven so as to open the throttle valve 13 to the basic opening Tho at step S25.

A judgment is made at step S26 as to whether a signal level Qx3 of a signal from the third oxygen concentration sensor 28 is higher than a specified third reference signal level Qx3o, that is, whether the engine 1 is under an HC release engine operating condition in which the HC trapping material of the HC trapping catalyst 27 is caused to release HC. When the amount of released HC increases, the oxygen concentration of exhaust gas lowers.

Figure 15A:
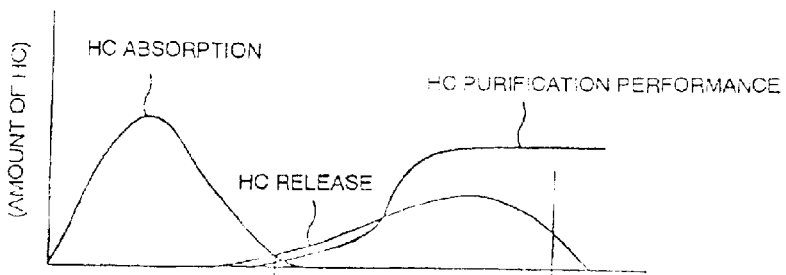
FIGS. 15A, 15B and 15C are time charts showing the control of an air-fuel ratio.
Figure 15B:
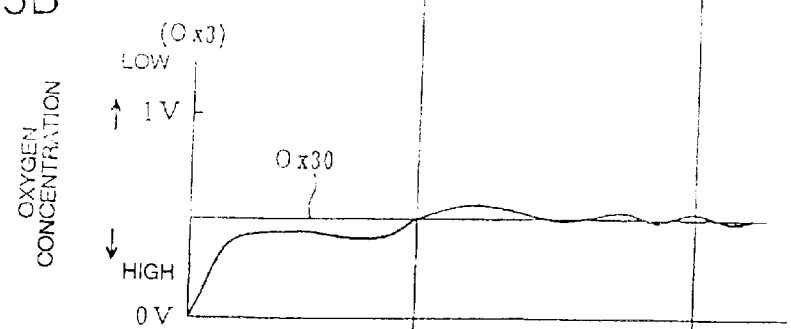

As shown in FIGS. 15A and 15B, the third reference signal level Qx3o corresponds the oxygen concentration of exhaust gas when the amount of released HC from the HC trapping material of the HC trapping catalyst 27 becomes greater than the amount of trapped or absorbed HC in the same. In this instance, a high signal level Ox3 indicates that the oxygen concentration of exhaust gas is low. Accordingly, when the signal level Qx3 is higher than the third reference signal level Qx3o, the oxygen concentration of exhaust gas is lower than a specified reference concentration. This is the same as to signals from the first and second oxygen concentration sensors 24 and 26, respectively. In this instance, it is judged that the engine 1 is under an HC release engine operating condition in which the HC trapping material of the HC trapping catalyst 27 is caused to release HC when a change rate $\Delta$Ox3 of a signal level Ox3 is higher than a specified reference change rate$\Delta$Ox3o or when a temperature of the HC trapping catalyst 27, that is estimated on the basis of a lapse of time since an engine start and a record of engine operation, is in a specified range.

When the answer to the decision at step S26 is negative, this indicates that the signal level Qx3 is lower than the third reference signal level Qx3o, i.e. the engine 1 is under an engine operating condition in which the HC trapping material of the HC trapping catalyst 27 is hard to release HC, another judgment is made at step S27 as to whether a signal level Qx1 of a signal from the first oxygen concentration sensor 24 is higher than a specified first reference signal level Qx1o, that is, whether the combustion chamber mean air-fuel ratio shows a tendency to be richer than a preset combustion chamber mean air-fuel ratio.

When the answer to the decision at step S27 is affirmative, this indicates that the combustion chamber mean air-fuel ratio shows a tendency to be richer than the preset mean air-fuel ratio, then, at step S28, a first feedback control amount of fuel injection Qf/b1 is established by subtracting a first correction value $\alpha$ from a first feedback control amount of fuel injection Qf/b1' established in the preceding control cycle in order to correct the air-fuel ratio toward a lean side by decreasing the amount of fuel injection. On the other hand, when the answer to the decision at step S27 is negative, this indicates that the combustion chamber mean air-fuel ratio shows a tendency to be leaner than the preset mean air-fuel ratio, then, at step S29, the first feedback control amount of fuel injection Qf/b1 is established by adding the first correction value $\alpha$ to the first feedback control amount of fuel injection Qf/b1' in order to correct the air-fuel ratio toward a rich side by increasing the amount of fuel injection. After having established the first feedback control amount of fuel injection Qf/b1 at step S28 or S29, after resetting a second feedback control amount of fuel injection Qf/b2 to 0 (zero) at step S30, the sequence logic proceeds to a function block at step S31 in FIG. 14B.

Referring to FIG. 14B, at step S31, an actual amount of fuel injection Qp is calculated by adding the basic amount of fuel injection Qb and the first and second feedback control amounts of fuel injection Qf/b1 and Qf/b2 together at step. When a given injection timing is reached at step S32, the fuel injection control is implemented at the given injection timing to make the actual amount of fuel injection at step S33.

Referring back to FIG. 14A, when the answer to the decision at step S26 is affirmative, this indicates that the signal level Qx3 is higher than the third reference signal level Qx3o, i.e. the engine 1 is under an HC releasing engine operating condition in which the HC trapping material of the HC trapping catalyst 27 is caused to release HC, another judgment is made at step S34 as to whether a signal level Qx2 of a signal from the second oxygen concentration sensor 26 is higher than a specified second reference signal level Qx2o, that is, whether the oxygen concentration of an exhaust gas entering the HC trapping catalyst 27 shows a tendency to be richer than an oxygen concentration of exhaust gas at an air-fuel ratio of 14.5.

When the answer to the decision at step S34 is affirmative, this indicates that the combustion chamber mean air-fuel ratio shows a tendency to be richer than the air-fuel ratio of 14.5, then, at step S35, a second feedback control amount of fuel injection Qf/b2 is established by subtracting a second correction value β from a second feedback control amount of fuel injection Qf/b2' established in the preceding control cycle in order to correct the air-fuel ratio toward a lean side by decreasing the amount of fuel injection. On the other hand, when the answer to the decision at step S34 is negative, this indicates that the combustion chamber mean air-fuel ratio shows a tendency to be leaner than the air-fuel ratio of 14.5, then, at step S36, the second feedback control amount of fuel injection Qf/b2 is established by adding the second correction value β to the second feedback control amount of fuel injection Qf/b2' in order to correct the air-fuel ratio toward a rich side by increasing the amount of fuel injection. The second correction value β is predetermined smaller than the first correction value α so as to make a fluctuation amplitude of air-fuel ratio small in the perturbation control, thereby lowering the oxygen concentration of exhaust gas.

After having established the first feedback control amount of fuel injection Qf/b2 at step S35 or S36, the sequence logic precedes to another judgment is made at step S37 as to whether the second feedback control amount of fuel injection Qf/b2 is smaller than a specified reference second feedback control amount of fuel injection Qf/b2o as shown in FIG. 14B. When the answer is affirmative, this indicates that the combustion chamber mean air-fuel ratio possibly becomes leaner than the stoichiometric air-fuel ratio, then, at step S38, the second feedback control amount of fuel injection Qf/b2 is replaced with a specified reference feedback control amount of fuel injection Qf/bo that can prevent the combustion chamber mean air-fuel ratio from changing lean.

Subsequently to the replacement of the second feedback control amount of fuel injection Qf/b2 with the specified reference feedback control amount of fuel injection Qf/bo at step S38 or when the answer to the judgment regarding second feedback control amount of fuel injection Qf/b2 made at step S37 is negative, that is, when the second feedback control amount of fuel injection Qf/b2 is larger than the specified reference second feedback control amount of fuel injection Qf/b2o, this indicates no possibility that the combustion chamber mean air-fuel ratio becomes leaner than the stoichiometric air-fuel ratio, after resetting the first feedback control amount of fuel injection Qf/b1 to 0 (zero) at step S39, an actual amount of fuel injection Qp is calculated by adding the basic amount of fuel injection Qb and the first and second feedback control amounts of fuel injection Qf/b1 and Qf/b2 together at step S31. The sequence logic proceeds steps S32 and S33 to implement the fuel injection control to spray the actual amount of fuel injection Qp when the given injection timing is reached.

Figure 15C:
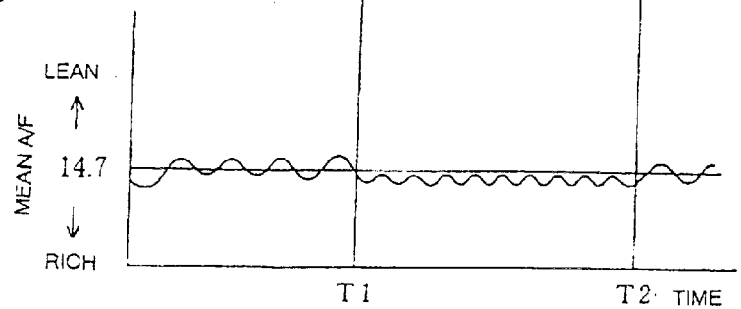

In the perturbation control of air-fuel ratio, at a pint of time T1 at which an HC release engine operating condition is attained at a point of time T1 resulting from a raise in temperature of the HC trapping catalyst 27 as shown in FIG. 15B, while the combustion chamber mean air-fuel ratio is changed to a little rich, the second correction value β (fluctuation amplitude) is made smaller than the first correction value α that is used during ordinary engine operation after a termination of releasing HC or during engine operation before the HC release engine operating condition has been attained, as shown in FIG. 15C. In addition, the second feedback control amount of fuel injection Qf/b2 is prevented from falling below the reference second feedback control amount of fuel injection Qf/b2o that is a lower limit.

Accordingly, the mean air-fuel ratio is prevented from being temporarily changed to lean. This causes an exhaust gas entering the HC trapping catalyst 27 to reliably bring its oxygen concentration down, so that the Ce—Pr double oxide releases high active oxygen. As a result, even while the HC trapping catalyst 27 is at a temperature as low as 150° C., HC released from the HC trapping material of the HC trapping catalyst 27 is efficiently oxidized and purified with the high active oxygen.

The present invention has been described with reference to preferred embodiments thereof. However, it will be appreciated that variants and other embodiments can be effected by person of ordinary skill in the art without departing from the scope of the invention.

What is claimed is:

1. An exhaust gas purifying catalyst comprising:
  an HC trapping material that traps HC in an exhaust gas under a comparatively low exhaust gas temperature and releases HC into said exhaust gas with a rise in exhaust gas temperature; and
  a catalytic material that purifies HC released into said exhaust gas from said HC trapping material;
  wherein said catalytic material contains a Ce—Pr double oxide containing Ce and Pr ions and further contains alumina 60 to 90% in weight of a total weight of said alumina and said Ce—Pr double oxide.

2. An exhaust gas purifying catalyst as defined in claim 1, wherein either one of said HC trapping material and said catalytic material is coated as an under layer on a substrate and the other of said HC trapping material and said catalytic material is coated as an outer layer over said under layer.

3. An exhaust gas purifying catalyst as defined in claim 1, wherein said catalytic material further contains at least one noble metal selected from a group consisting of Pt, Pd and Rh.

4. An exhaust gas purifying catalyst as defined in claim 1, wherein said catalytic material further contains a NOx trapping material that traps NOx in an exhaust gas while said exhaust gas is under a comparatively high oxygen concentration and releases said NOx while said exhaust gas is under a comparatively low oxygen concentration.

5. An exhaust gas purifying catalyst as defined in claim 1, wherein said HC trapping material consists of β-type zeolite.

6. An exhaust gas purifying catalyst comprising:
   an HC trapping material that traps HC in an exhaust gas under a comparatively low exhaust gas temperature and releases HC into said exhaust gas with a rise in exhaust gas temperature; and
   a catalytic material that purifies HC released into said exhaust gas from said HC trapping material;
   wherein said catalytic material contains a Ce—Pr double oxide containing Ce and Pr ions so that said Ce—Pr double oxide contains 10% to 95% Pr in the number of atoms to a total number of atoms of Ce and Pr.

7. An exhaust gas purifying catalyst as defined in claim 6, wherein either one of said HG trapping material and said catalytic material is coated as an under layer on a substrate and the other of said HG trapping material and said catalytic material is coated as an outer layer over said under layer.

8. An exhaust gas purifying in claim 6, wherein said catalytic material further contains at least one noble metal selected from a group consisting of Pt, Pd, and Rh.

9. An exhaust gas purifying catalyst as defined in claim 6, wherein said catalytic material further contains a NOx trapping material that traps NOx in an exhaust gas while said exhaust gas is under a comparatively high oxygen concentration and releases said NOx while said exhaust gas is under a comparatively low oxygen concentration.

10. An exhaust gas purifying catalyst as defined in claim 6, wherein said HC trapping material consists of β-type zeolite.

11. An exhaust gas purifying catalyst comprising:
    a β-type zeolite HC trapping material that traps HC in an exhaust gas under a comparatively low exhaust gas temperature and releases the trapped HC into said exhaust gas with a rise in exhaust gas temperature; and
    a catalytic material that purifies HC released into said exhaust gas from said HC trapping material;
    wherein said catalytic material contains a Ce—Pr double oxide containing Ce and Pr ions and further contains alumina 60 to 90% in weight of total weight of said alumina and said Ce—Pr double oxide.

12. An exhaust gas purifying catalyst as defined in claim 11, wherein either one of said HC trapping material and said catalytic material is coated as an under layer on a substrate and the other of said HC trapping material and said catalytic material is coated as an outer layer over said under layer.

13. An exhaust gas purifying catalyst as defined in claim 11, wherein said catalytic material further contains at least one noble metal selected from a group consisting of Pt, Pd and Rh.

14. An exhaust gas purifying catalyst as defined in claim 11, wherein said catalytic material further contains a NOx trapping material that traps NOx in an exhaust gas while said exhaust gas is under a comparatively high oxygen concentration and releases said NOx while said exhaust gas is under a comparatively low oxygen concentration.

15. An exhaust gas purifying catalyst comprising:
    a β-type zeolite HC trapping material that traps HC in an exhaust gas under a comparatively low exhaust gas temperature and releases the trapped HC into said exhaust gas with a rise in exhaust gas temperature; and
    a catalytic material that purifies HC released into said exhaust gas from said HC trapping material;
    wherein said catalytic material contains a Ce—Pr double oxide containing Ce and Pr ions so that said Ce—Pr double oxide contains 10% to 95% Pr in the number of atoms to a total number of atoms of Ce and Pr.

16. An exhaust gas purifying catalyst as defined in claim 15, wherein either one of said HC trapping material and said catalytic material is coated as an under layer on a substrate and the other of said HC trapping material and said catalytic material is coated as an outer layer over said under layer.

17. An exhaust gas purifying catalyst as defined in claim 15, wherein said catalytic material further contains at least one noble metal selected from a group consisting of Pt, Pd, and Rh.

18. An exhaust gas purifying catalyst as defined in claim 15, wherein said catalytic material further contains a NOx trapping material that traps NOx in an exhaust gas while said exhaust gas is under a comparatively high oxygen concentration and releases said NOx while said exhaust gas is under a comparatively low oxygen concentration.

19. An exhaust gas purifying catalyst comprising:
    a first catalyst layer containing an HC trapping material that traps HC in an exhaust gas while the exhaust gas is under a comparatively low exhaust gas temperature and releases the trapped HC into said exhaust gas with a rise in exhaust gas temperature;
    the first catalyst layer further containing a NOx trapping material that traps NOx in said exhaust gas while said exhaust gas contains a comparatively high amount of oxygen and releases the trapped NOx into said exhaust gas while said exhaust gas contains a comparatively low amount of oxygen;
    the first catalyst layer further containing a noble metal that oxidizes HC released from said HC trapping material into said exhaust gas and reduces NOx released from said NOx trapping material of said first catalyst layer into said exhaust gas;
    a second catalyst layer containing a catalytic material that purifies HC released into said exhaust gas from said HC trapping material, the catalytic material containing a Ce—Pr double oxide containing Ce and Pr ions and further containing alumina 60 to 90% in weight of a total weight of said alumina and said Ce—Pr double oxide;
    the second catalyst layer further containing a NOx trapping material that traps NOx in said exhaust gas while said exhaust gas contains a comparatively high amount of oxygen and releases NOx into said exhaust gas while said exhaust gas contains a comparatively low amount of oxygen;
    the second catalyst layer further containing a noble metal that oxidizes HC released from said HC trapping material into said exhaust gas and reduces NOx released from said NOx trapping material of said second catalyst layer into said exhaust gas.

20. An exhaust gas purifying catalyst as defined in claim 19, wherein one of said first and second catalyst layers is coated on the other one of said first and second catalyst layers.

21. An exhaust gas purifying catalyst as defined in claim 19, wherein said noble metals of said first and second catalyst layers are selected from a group consisting of Pt, Pd and Rh.

22. An exhaust gas purifying catalyst comprising:
    a first catalyst layer containing an HC trapping material that traps HC in an exhaust gas while the exhaust gas is under a comparatively low exhaust gas temperature and releases the trapped HC into said exhaust gas with a rise in exhaust gas temperature;

the first catalyst layer further containing a NOx trapping material that traps NOx in said exhaust gas while said exhaust gas contains a comparatively high amount of oxygen and releases the trapped NOx into said exhaust gas while said exhaust gas contains a comparatively low amount of oxygen;

the first catalyst layer further containing a noble metal that oxidizes HC released from said HC trapping material into said exhaust gas and reduces NOx released from said NOx trapping material of said first catalyst layer into said exhaust gas;

a second catalyst layer containing a catalytic material that purifies HC released into said exhaust gas from said HC trapping material, the catalytic material containing a Ce—Pr double oxide containing Ce and Pr ions so that said Ce—Pr double oxide contains 10% to 95% Pr in the number of atoms to a total number of atoms of Ce and Pr;

the second catalyst layer further containing a NOx trapping material that traps NOx in said exhaust gas while said exhaust gas contains a comparatively high amount of oxygen and releases NOx into said exhaust gas while said exhaust gas contains a comparatively low amount of oxygen;

the second catalyst layer further containing a noble metal that oxidizes HC released from said HC trapping material into said exhaust gas and reduces NOx released from said NOx trapping material of said second catalyst layer into said exhaust gas.

23. An exhaust gas purifying catalyst as defined in claim 22, wherein one of said first and second catalyst layers is coated on the other one of said first and second catalyst layers.

24. An exhaust gas purifying catalyst as defined in claim 22, wherein said noble metals of said first and second catalyst layers are selected from a group consisting of Pt, Pd, and Rh.

* * * * *